(12) United States Patent
Ganti et al.

(10) Patent No.: US 12,507,371 B2
(45) Date of Patent: Dec. 23, 2025

(54) METHOD AND SYSTEM FOR TAILORING FLUIDIC RESONANT FREQUENCY IN A MEMS-BASED COOLING SYSTEM

(71) Applicant: Frore Systems Inc., San Jose, CA (US)

(72) Inventors: Suryaprakash Ganti, Los Altos, CA (US); Vikram Mukundan, San Ramon, CA (US); Ananth Saran Yalamarthy, Stanford, CA (US); Seshagiri Rao Madhavapeddy, La Jolla, CA (US); Prabhu Sathyamurthy, San Jose, CA (US); Narayana Prasad Rayapati, Mountain View, CA (US)

(73) Assignee: Frore Systems Inc., San Jose, CA (US)

( * ) Notice: Subject to any disclaimer, the term of this patent is extended or adjusted under 35 U.S.C. 154(b) by 329 days.

(21) Appl. No.: 18/082,527

(22) Filed: Dec. 15, 2022

(65) Prior Publication Data
US 2023/0200000 A1    Jun. 22, 2023

Related U.S. Application Data

(60) Provisional application No. 63/291,273, filed on Dec. 17, 2021.

(51) Int. Cl.
*H05K 7/20* (2006.01)
*G06F 1/20* (2006.01)

(52) U.S. Cl.
CPC .......... *H05K 7/20145* (2013.01); *G06F 1/20* (2013.01); *H05K 7/20272* (2013.01); *H05K 7/20509* (2013.01)

(58) Field of Classification Search
CPC .... F04B 43/095; F04B 45/046; F04B 43/046; H01L 23/467; H05K 7/20272
See application file for complete search history.

(56) References Cited

U.S. PATENT DOCUMENTS

| | | | |
|---|---|---|---|
| 2020/0053905 A1* | 2/2020 | Ganti | ...................... F04D 33/00 |
| 2021/0277883 A1* | 9/2021 | Tanaka | ................... F04B 45/047 |

* cited by examiner

*Primary Examiner* — Eric S Ruppert
(74) *Attorney, Agent, or Firm* — Van Pelt, Yi & James LLP

(57) ABSTRACT

A fluid flow system is described. The fluid flow system includes an actuator and a chamber having a feature therein. The actuator is configured to vibrate in response to a driving signal. The chamber is in communication with the actuator. The chamber is characterized by a fluidic resonant frequency. Vibration of the actuator tends to drive a fluid through the chamber. The feature is within the chamber and obstructs direct flow of the fluid within the chamber such that the fluidic resonant frequency is less than a nominal fluidic resonant frequency that would exist without the feature.

19 Claims, 10 Drawing Sheets

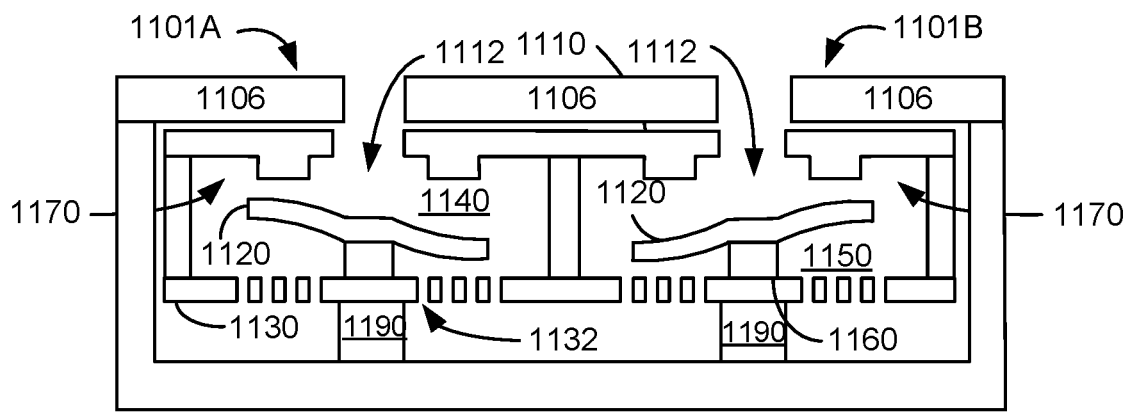
FIG. 11B
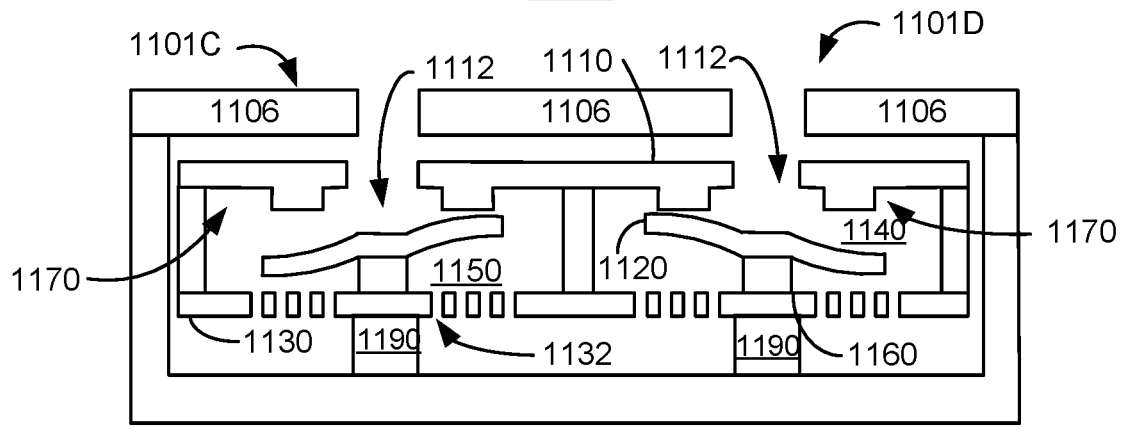
FIG. 11C
1200
Drive Actuator(s) at (Optionally Resonant) Frequency, Optionally 180 Degrees out of Phase for Multiple Cooling Elements — 1202
Using Feedback from the Cooling Element(s) to Maintain Cooling Element(s) at Resonant Frequency — 1204
FIG. 12

METHOD AND SYSTEM FOR TAILORING FLUIDIC RESONANT FREQUENCY IN A MEMS-BASED COOLING SYSTEM

CROSS REFERENCE TO OTHER APPLICATIONS

This application claims priority to U.S. Provisional Patent Application No. 63/291,273 entitled METHOD AND SYSTEM FOR TAILORING FLUIDIC RESONANT FREQUENCY IN A MEMS-BASED COOLING SYSTEM filed Dec. 17, 2021 which is incorporated herein by reference for all purposes.

BACKGROUND OF THE INVENTION

As computing devices grow in speed and computing power, the heat generated by the computing devices also increases. Various mechanisms have been proposed to address the generation of heat. Active devices, such as fans, may be used to drive air through large computing devices, such as laptop computers or desktop computers. Passive cooling devices, such as heat spreaders, may be used in smaller, mobile computing devices, such as smartphones, virtual reality devices and tablet computers. However, such active and passive devices may be unable to adequately cool both mobile devices such as smartphones and larger devices such as laptops and desktop computers. Consequently, additional cooling solutions for computing devices are desired. Moreover, such cooling systems may be desired to be optimized to better provide the desired cooling for mobile and other devices.

BRIEF DESCRIPTION OF THE DRAWINGS

Various embodiments of the invention are disclosed in the following detailed description and the accompanying drawings.

FIGS. 11A-11C depict an embodiment of an active cooling system formed in a tile.

FIG. 12 is a flow chart depicting an embodiment of a method for driving flow through a flow chamber.

DETAILED DESCRIPTION

Figure 1A:
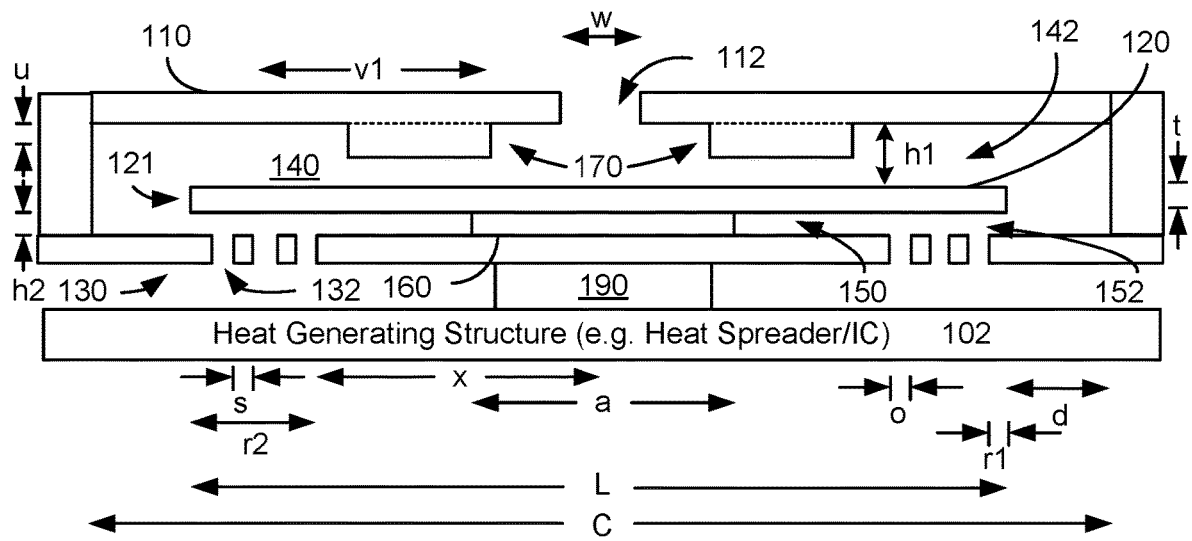
FIGS. 1A-1H depict an embodiment of an active cooling system including an actuator and features in the upper chamber and an actuator usable therein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As semiconductor devices become increasingly powerful, the heat generated during operations also grows. For example, processors for mobile devices such as smartphones, tablet computers, notebook computers, virtual reality devices, and other computing devices such as servers can operate at high clock speeds, but produce a significant amount of heat. Because of the quantity of heat produced, processors may run at full speed only for a relatively short period of time. After this time expires, throttling (e.g. slowing of the processor's clock speed) occurs. Although throttling can reduce heat generation, it also adversely affects processor speed and, therefore, the performance of devices using the processors. As technology moves to 5G and beyond, this issue is expected to be exacerbated.

Larger devices, such as laptop or desktop computers include electric fans that have rotating blades. The fan that can be energized in response to an increase in temperature of internal components. The fans drive air through the larger devices to cool internal components. However, such fans are typically too large for mobile devices such as smartphones or for thinner devices such as tablet computers. Fans also may have limited efficacy because of the boundary layer of air existing at the surface of the components, provide a limited airspeed for air flow across the hot surface desired to be cooled and may generate an excessive amount of noise. Passive cooling solutions may include components such as a heat spreader and a heat pipe or vapor chamber to transfer heat to a heat exchanger. Although a heat spreader somewhat mitigates the temperature increase at hot spots, the amount of heat produced in current and future devices may not be adequately addressed. Similarly, a heat pipe or vapor chamber may provide an insufficient amount of heat transfer to remove excessive heat generated.

Although described in the context of a cooling system, the techniques and/or devices described herein may be used in other applications. For example, the actuator may be used in other devices and/or the cooling system may be used for other purposes. The devices are also described in the context of actuators (i.e. cooling elements) that are coupled to a support structure at a central region or at the edges. In other embodiments, the actuator could be coupled to (e.g. anchored to) a support structure in another manner. For example, the actuator may be attached to the support structure along an edge of the actuator. Various systems are described and particular features highlighted. Various characteristics of the systems may be combined in manners not explicitly depicted herein.

A fluid flow system is described. The fluid flow system includes an actuator and a chamber having a feature therein. The actuator is configured to vibrate in response to a driving signal. The chamber is in communication with the actuator. The chamber is characterized by a fluidic resonant frequency. Vibration of the actuator tends to drive a fluid through the chamber. The feature is within the chamber and obstructs direct flow of the fluid within the chamber such that the fluidic resonant frequency is less than a nominal fluidic resonant frequency that would exist without the feature. In some embodiments, the feature is configured to increase an effective length for the chamber. In some embodiments, the chamber includes an upper chamber and a lower chamber. The actuator is between the upper chamber and the lower chamber. The feature is in the upper chamber. The actuator directs the fluid from the upper chamber to the lower chamber in response to the driving signal.

The chamber may include an upper chamber having a top wall. In some such embodiments, the feature includes at least one mesa extending from the top wall. The mesa(s) may be configured such that at least seventy-five percent of the fluid is directed around the mesa and not more than twenty-five percent of the fluid travels between the mesa and the actuator. The mesa(s) may have footprint(s) configured to reduce fluidic vortices. In some embodiments, the footprint is selected from a triangle, a diamond, and a flattened diamond. In some embodiments, the upper chamber has a top wall having a split vent therein. The split vent includes a first aperture and a second aperture. The feature includes a divider wall separating the first aperture from the second aperture such that the first aperture is in fluid communication with a first portion of the chamber and the second aperture is in fluid communication with a second portion of the chamber. In some such embodiments, the chamber is characterized by a center line. The first aperture is offset from the center line in a first direction and the second aperture is offset from the center line in a second direction opposite to the first direction. The split vent may include a third aperture and a fourth aperture. The fluid flow system may further include a support structure. In such embodiments, the actuator includes a central region and a perimeter. The actuator is supported by the support structure at the central region. At least a portion of the perimeter is unpinned and vibrates in response to the driving signal.

A cooling system including a cooling element, a chamber, and a feature within the chamber are described. The cooling element vibrates in response to a driving signal. The chamber is in communication with the cooling element and is characterized by a fluidic resonant frequency. The chamber includes an orifice plate having at least one orifice therein. Vibration of the actuator tends to drive a fluid through the chamber and out the orifice(s). The feature obstructs direct flow of the fluid within the chamber such that the fluidic resonant frequency is less than a nominal fluidic resonant frequency that would exist without the feature. The feature may be configured to increase an effective length for the chamber.

The chamber may include an upper chamber having a top wall. The feature may include at least one mesa extending from the top wall. The mesa(s) are configured such that at least seventy-five percent of the fluid is directed around the mesa(s) and not more than twenty-five percent of the fluid travels between the mesa(s) and the cooling element. In some embodiments, the chamber includes an upper chamber having a top wall. The top wall may have a split vent therein. The split vent includes a first aperture and a second aperture. The feature includes a divider wall separating the first aperture from the second aperture such that the first aperture is in fluid communication with a first portion of the chamber and the second aperture is in fluid communication with a second portion of the chamber. In some embodiments, the chamber is characterized by a center line. In such embodiments, the first aperture is offset from the center line in a first direction, and the second aperture is offset from the center line in a second direction opposite to the first direction.

The cooling system may include a support structure. In such embodiments, the cooling element includes a central region and a perimeter. The cooling element is supported by the support structure at the central region. At least a portion of the perimeter is unpinned and vibrates in response to the driving signal.

A method includes driving an actuator configured to induce a vibrational motion at a frequency. The actuator is in communication with a chamber. The chamber is characterized by a fluidic resonant frequency. Vibration of the actuator tends to drive a fluid through the chamber. A feature resides within the chamber and obstructs direct flow of the fluid within the chamber such that the fluidic resonant frequency is less than a nominal fluidic resonant frequency that would exist without the feature. In some embodiments, the feature is configured to increase an effective length for the chamber.

FIGS. 1A-1H are diagrams depicting an exemplary embodiment of active MEMS cooling system 100 usable with heat-generating structure 102 and including a centrally anchored cooling element 120 or 120' (also referred to herein as actuator 120 or 120'). Cooling element 120 and cooling element 120' are interchangeable. For clarity, only certain components are shown. FIGS. 1A-1H are not to scale. Although shown as symmetric, cooling system 100 need not be.

Figure 1B:
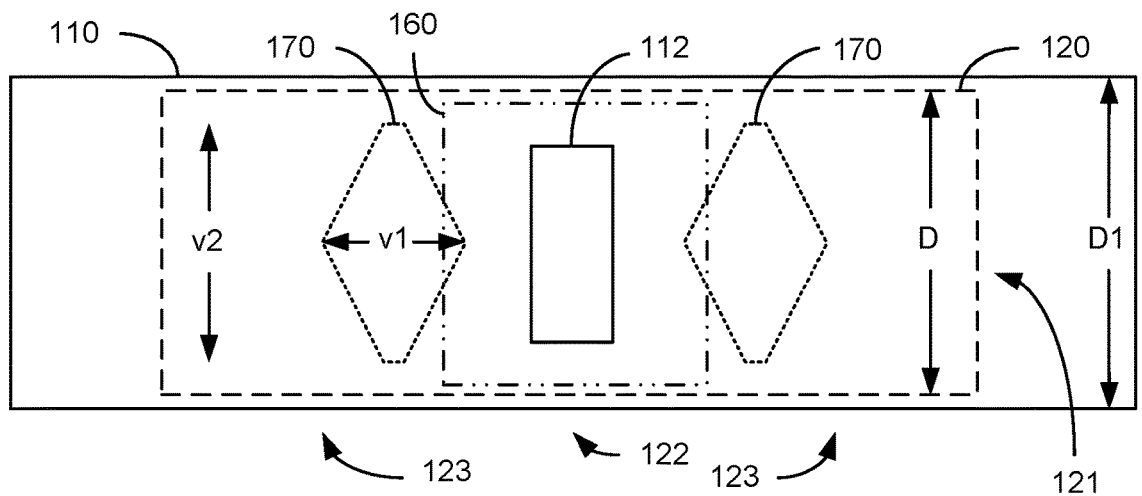

FIGS. 1A and 1B depict cross-sectional and top views of cooling system 100. Cooling system 100 includes top plate 110 having vent 112 therein, actuator (or cooling element) 120, orifice plate 130 having orifices 132 therein, support structure (or "anchor") 160 and chambers 140 and 150 (collectively chamber 140/150) formed therein. The top wall of flow/chamber 140/150 is formed by the bottom surface of top plate 110 in the embodiment shown. Flow chamber 140/150 may thus be considered to be formed between top plate 110 and orifice plate 130. The top wall of flow chamber 140/150 has features 170 thereon. Actuator 120 is supported at its central region by anchor 160. In FIG. 1B, actuator 120 is shown by a dashed line and anchor 160 is shown by a dotted/dashed line. For simplicity, orifices 132 are not depicted in FIG. 1B. Regions of actuator 120 closer to and including portions of the actuator's perimeter (e.g. tip 121) vibrate when actuated. Regions of actuator 120 closer to and including portions of the actuator's perimeter (e.g. tip 121) vibrate when actuated. In some embodiments, tip 121 of actuator 120 includes a portion of the perimeter furthest from anchor 160 and undergoes the largest deflection during actuation of actuator 120. For clarity, only one tip 121 of actuator 120 is labeled in FIG. 1A. Also shown is pedestal 190 that connects orifice plate 130 to and offsets orifice plate 130 from heat-generating structure 102. In some embodiments, pedestal 190 also thermally couples orifice plate 130 to heat-generating structure 102.

FIG. 1A depicts cooling system 100 in a neutral position. Thus, actuator 120 is shown as substantially flat. For in-phase operation, actuator 120 is driven to vibrate between positions shown in FIGS. 1B and 1C. This vibrational motion draws fluid (e.g. air) into vent 112, through chambers 140 and 150 and out orifices 132 at high speed and/or flow rates. For example, the speed at which the fluid impinges on heat-generating structure 102 may be at least thirty meters per second. In some embodiments, the fluid is driven by actuator 120 toward heat-generating structure 102 at a speed of at least forty-five meters per second. In some embodiments, the fluid is driven toward heat-generating structure 102 by actuator 120 at speeds of at least sixty meters per second. Other speeds may be possible in some embodiments. Cooling system 100 is also configured so that little or no fluid is drawn back into chamber 140/150 through orifices 132 by the vibrational motion of actuator 120.

Heat-generating structure 102 is desired to be cooled by cooling system 100. In some embodiments, heat-generating structure 102 generates heat. For example, heat-generating structure may be an integrated circuit. In some embodiments, heat-generating structure 102 is desired to be cooled but does not generate heat itself. Heat-generating structure 102 may conduct heat (e.g. from a nearby object that generates heat). For example, heat-generating structure 102 might be a heat spreader or a vapor chamber. Thus, heat-generating structure 102 may include semiconductor component(s) including individual integrated circuit components such as processors, other integrated circuit(s) and/or chip package(s); sensor(s); optical device(s); one or more batteries; other component(s) of an electronic device such as a computing device; heat spreaders; heat pipes; other electronic component(s) and/or other device(s) desired to be cooled. In some embodiments, heat-generating structure 102 may be a thermally conductive part of a module containing cooling system 100. For example, cooling system 100 may be affixed to heat-generating structure 102, which may be coupled to another heat sink, vapor chamber, integrated circuit, or other separate structure desired to be cooled.

The devices in which cooling system 100 is desired to be used may also have limited space in which to place a cooling system. For example, cooling system 100 may be used in computing devices. Such computing devices may include but are not limited to smartphones, tablet computers, laptop computers, tablets, two-in-one laptops, hand held gaming systems, digital cameras, virtual reality headsets, augmented reality headsets, mixed reality headsets and other devices that are thin. Cooling system 100 may be a micro-electro-mechanical system (MEMS) cooling system capable of residing within mobile computing devices and/or other devices having limited space in at least one dimension. For example, the total height of cooling system 100 (from the top of heat-generating structure 102 to the top of top plate 110) may be less than 2 millimeters. In some embodiments, the total height of cooling system 100 is not more than 1.5 millimeters. In some embodiments, this total height is not more than 1.1 millimeters. In some embodiments, the total height does not exceed one millimeter. In some embodiments, the total height does not exceed two hundred and fifty micrometers. Similarly, the distance between the bottom of orifice plate 130 and the top of heat-generating structure 102, y, may be small. In some embodiments, y is at least two hundred micrometers and not more than 1.2 millimeter. For example, y may be at least two hundred and fifty micrometers and not more than three hundred micrometers. In some embodiments, y is at least five hundred micrometers and not more than one millimeter. In some embodiments, y is at least two hundred micrometers and not more than three hundred micrometers. Thus, cooling system 100 is usable in computing devices and/or other devices having limited space in at least one dimension. However, nothing prevents the use of cooling system 100 in devices having fewer limitations on space and/or for purposes other than cooling. Although one cooling system 100 is shown (e.g. one cooling cell), multiple cooling systems 100 might be used in connection with heat-generating structure 102. For example, a one or two-dimensional array of cooling cells might be utilized.

Cooling system 100 is in communication with a fluid used to cool heat-generating structure 102. The fluid may be a gas or a liquid. For example, the fluid may be air. In some embodiments, the fluid includes fluid from outside of the device in which cooling system 100 resides (e.g. provided through external vents in the device). In some embodiments, the fluid circulates within the device in which cooling system resides (e.g. in an enclosed device).

Actuator 120 can be considered to divide the interior of active MEMS cooling system 100 into top chamber 140 and bottom chamber 150. Top chamber 140 is formed by actuator 120, the sides, and top plate 110. Bottom chamber 150 is formed by orifice plate 130, the sides, actuator 120 and anchor 160. Top chamber 140 and bottom chamber 150 are connected at the periphery of actuator 120 and together form chamber 140/150 (e.g. an interior chamber of cooling system 100).

The size and configuration of top chamber 140 may be a function of the cell (cooling system 100) dimensions, actuator 120 motion, and the frequency of operation. Top chamber 140 has a height, h1. The height of top chamber 140 may be selected to provide sufficient pressure to drive the fluid to bottom chamber 150 and through orifices 132 at the desired flow rate and/or speed. Top chamber 140 is also sufficiently tall that actuator 120 does not contact top plate 110 when actuated. In some embodiments, the height of top chamber 140 is at least fifty micrometers and not more than five hundred micrometers. In some embodiments, top chamber 140 has a height of at least two hundred and not more than three hundred micrometers.

Top plate 110 also includes features 170 that extend from top plate 110. In FIG. 1B, features 170 are depicted by dotted lines. Features 170 may be considered to be mesas or pedestals that protrude from top plate 110. Thus, cavities may be considered to be formed around features 170. For example, cavities may be considered to be formed between features 170 and the outer wall of top chamber 140. Although shown as having a particular shape (i.e. diamond shaped), features 170 may have another shape including but not limited to rectangular, triangular, oval, circular, and/or another shape. Although features 170 are shown as symmetric and having the same shape, in some embodiments, features 170 may have different shapes and/or may be asymmetric. Although shown as located closer to vent 112 in top chamber 110, features 170 may be located elsewhere. Features 170 may have a height, u, of at least one hundred and fifty micrometers and not more than four hundred and fifty micrometers (e.g. at least fifty percent and not more than ninety percent). In some embodiments, features 170 may have a height of at least two hundred and fifty micrometers (e.g. at least seventy percent of the upper chamber height in some embodiments). However, the height of features 170 is also desired to be sufficiently small that cantilevered arms 123 do not strike features 170 (as well as orifice plate 130 and the remainder of top plate 110). The length, v1, of features 170 may be at least ten percent and not more than ninety percent of the length of a free portion of actuator 120). The width of features 170, v2, may be at ten percent of the width, D, of actuator 120 and not more than ninety percent the width of upper chamber. Because of the presence of features 170, top plate 110 may be viewed as having a varying thickness, top chamber 140 (and flow chamber 140/150) may be viewed as having a varying height, and flow chamber 140/150 may be viewed as having a top surface with features 170 protruding therefrom (or, conversely, a top surface having cavities therein).

Bottom chamber 150 has a height, h2. In some embodiments, the height of bottom chamber 150 is sufficient to accommodate the motion of actuator 120. Thus, no portion of actuator 120 contacts orifice plate 130 during normal operation. Bottom chamber 150 is generally smaller than top chamber 140 and may aid in reducing the backflow of fluid into orifices 132. In some embodiments, the height of bottom chamber 150 is the maximum deflection of actuator 120 plus at least five micrometers and not more than ten micrometers. In some embodiments, the deflection of actuator 120 (e.g. the deflection of tip 121), z, has an amplitude of at least ten micrometers and not more than one hundred micrometers. In some such embodiments, the amplitude of deflection of actuator 120 is at least ten micrometers and not more than sixty micrometers. However, the amplitude of deflection of actuator 120 depends on factors such as the desired flow rate through cooling system 100 and the configuration of cooling system 100. Thus, the height of bottom chamber 150 generally depends on the flow rate through and other components of cooling system 100.

Top plate 110 includes vent 112 through which fluid may be drawn into cooling system 100. Top vent 112 may have a size chosen based on the desired acoustic pressure in chamber 140. For example, in some embodiments, the width, w, of vent 112 is at least five hundred micrometers and not more than one thousand micrometers. In some embodiments, the width of vent 112 is at least two hundred fifty micrometers and not more than two thousand micrometers. In the embodiment shown, vent 112 is a centrally located aperture in top plate 110. In other embodiments, vent 112 may be located elsewhere. For example, vent 112 may be closer to one of the edges of top plate 110. Vent 112 may have a circular, rectangular or other shaped footprint. Although a single vent 112 is shown, multiple vents might be used. For example, vents may be offset toward the edges of top chamber 140 or be located on the side(s) of top chamber 140. Although top plate 110 is shown as substantially flat, in some embodiments trenches and/or other structures may be provided in top plate 110 to modify the configuration of top chamber 140 and/or the region above top plate 110.

Anchor (support structure) 160 supports actuator 120 at the central portion of actuator 120. Thus, at least part of the perimeter of actuator 120 is unpinned and free to vibrate. In some embodiments, anchor 160 extends along a central axis of actuator 120 (e.g. perpendicular to the page in FIGS. 1A-1E). In such embodiments, portions of actuator 120 that vibrate (e.g. including tip 121) move in a cantilevered fashion. Thus, portions of actuator 120 may move in a manner analogous to the wings of a butterfly (i.e. in phase) and/or analogous to a seesaw (i.e. out of phase). Thus, the portions of actuator 120 that vibrate in a cantilevered fashion do so in phase in some embodiments and out of phase in other embodiments. In some embodiments, anchor 160 does not extend along an axis of actuator 120. In such embodiments, all portions of the perimeter of actuator 120 are free to vibrate (e.g. analogous to a jellyfish). In the embodiment shown, anchor 160 supports actuator 120 from the bottom of actuator 120. In other embodiments, anchor 160 may support actuator 120 in another manner. For example, anchor 160 may support actuator 120 from the top (e.g. actuator 120 hangs from anchor 160). In some embodiments, the width, a, of anchor 160 is at least 0.5 millimeters and not more than four millimeters. In some embodiments, the width of anchor 160 is at least two millimeters and not more than 2.5 millimeters. Anchor 160 may occupy at least ten percent and not more than fifty percent of actuator 120.

Actuator 120 has a first side distal from heat-generating structure 102 and a second side proximate to heat-generating structure 102. In the embodiment shown in FIGS. 1A-1G, the first side of actuator 120 is the top of actuator 120 (closer to top plate 110) and the second side is the bottom of actuator 120 (closer to orifice plate 130). Actuator 120 is actuated to undergo vibrational motion as shown in FIGS. 1A-1G. The vibrational motion of actuator 120 drives fluid from the first side of actuator 120 distal from heat-generating structure 102 (e.g. from top chamber 140) to a second side of actuator 120 proximate to heat-generating structure 102 (e.g. to bottom chamber 150). The vibrational motion of actuator 120 also draws fluid through vent 112 and into top chamber 140; forces fluid from top chamber 140 to bottom chamber 150; and drives fluid from bottom chamber 150 through orifices 132 of orifice plate 130. Although described in the context of a single, continuous actuator, in some embodiments, actuator 120 may be formed by two (or more) actuators. Each of the actuators as one portion pinned (e.g. supported by support structure 160) and an opposite portion unpinned. Thus, a single, centrally supported actuator 120 may be formed by a combination of multiple actuators supported at an edge.

Actuator 120 has a length, L, that depends upon the frequency at which actuator 120 is desired to vibrate. In some embodiments, the length of actuator 120 is at least four millimeters and not more than ten millimeters. In some such embodiments, actuator 120 has a length of at least six millimeters and not more than eight millimeters. The depth of actuator 120 (e.g. perpendicular to the plane shown in FIGS. 1A-1E) may vary from one fourth of L through twice L. For example, actuator 120 may have the same depth as length. The thickness, t, of actuator 120 may vary based upon the configuration of actuator 120 and/or the frequency at which actuator 120 is desired to be actuated. In some embodiments, the actuator thickness is at least two hundred micrometers and not more than three hundred and fifty micrometers for actuator 120 having a length of eight millimeters and driven at a frequency of at least twenty kilohertz and not more than twenty-five kilohertz. In some embodiments, actuator 120 is driven at a frequency of at least twenty-two kilohertz and not more than twenty four kilohertz. The length, C of chamber 140/150 is close to the length, L, of actuator 120. For example, in some embodiments, the distance, d, between the edge of actuator 120 and the wall of chamber 140/150 is at least one hundred micrometers and not more than five hundred micrometers. In some embodiments, d is at least two hundred micrometers and not more than three hundred micrometers. This distance, d, may be termed the edge vent.

In the embodiment shown, actuator 120 is supported (held in place) by anchor 160 along the central axis (out of the plane of the page in FIG. 1A) at central portion 122 (hereinafter anchored region 122). Thus, cantilevered arms 123 (denoted in FIG. 1B only) that are actuated to vibrate are to the right and left of anchor 160. In some embodiments, actuator 120 is a continuous structure having two portions which are free and actuated (e.g. the cantilevered arms 123). In some embodiments, actuator 120 includes separate cantilevered portions each of which is attached to the anchor 160 and actuated. Cantilevered arms 123 of actuator 120 may be driven to vibrate in a manner analogous to the wings of a butterfly (in-phase) or to a seesaw (out-of-phase).

Although not shown in FIGS. 1A-1G actuator 120 may include one or more piezoelectric layer(s). Thus, actuator 120 may be driven by a piezoelectric that is mounted on or integrated into actuator 120. In some embodiments, actuator 120 is driven in another manner including but not limited to providing a piezoelectric on another structure in cooling system 100. In some embodiments, it is possible that a mechanism other than a piezoelectric may be used to drive actuator 120. In some embodiments, piezoelectric may be located only on or in cantilevered arms 123 of actuator 120. In some embodiments, piezoelectric may be on or in all of actuator 120. Thus, actuator 120 may be a multilayer actuator in which the piezoelectric is integrated into actuator 120. For example, actuator 120 may include a piezoelectric layer on substrate. The substrate may include or consist of stainless steel, a Ni alloy, Hastelloy, Al (e.g. an Al alloy), and/or a Ti (e.g. a Ti alloy such as Ti6Al-4V). For example, in some embodiments, the substrate may include or consist of grade 2 Ti. Orifice plate 130 may be formed of the same material as the substrate. For example, orifice plate 130 may include or consist of grade 2 Ti. Top plate 110 and surrounding structures such as the frame and structures 306 and 396 depicted in FIGS. 3A-3G may be formed of a stainless steel such as SUS430. SUS430 or an analogous material may be selected to better match the coefficient of thermal expansion of the substrate and/or orifice plate 120. In some embodiments, orifice plate 130 is diffusion bonded to the substrate and/or anchor 160. In some embodiments, piezoelectric layer includes multiple sublayers formed as thin films on the substrate. In other embodiments, the piezoelectric layer may be a bulk layer affixed to the substrate. Such a piezoelectric actuator 120 also includes electrodes used to activate the piezoelectric. The substrate functions as an electrode in some embodiments. In other embodiments, a bottom electrode may be provided between the substrate and the piezoelectric layer. Other layers including but not limited to seed, capping, passivation or other layers might be included in piezoelectric actuator. Although described in the context of a piezoelectric, another mechanism for actuating actuator 120 can be utilized. Such other mechanisms may be on (e.g. affixed to) actuator 120, integrated into actuator 120 or may be located elsewhere (e.g. on anchor 160).

In the embodiment shown in FIG. 1B, anchor 160 extends most but not all of the depth, D, of actuator 120. The entire perimeter of actuator 120 is free. However, anchor 160 still holds in place the central, anchored region 122 of actuator 120. Thus, anchor 160 need not extend the entire length of the central axis in order for cantilevered arms 123 to vibrate as desired. In some embodiments, anchor 160 extends along the central axis to the perimeter of actuator 120. In some such embodiments, anchor 160 has a depth of at least D.

Although actuator 120 is depicted as rectangular, actuators may have another shape. In some embodiments, corners of actuator 120 may be rounded. In some embodiments, the entire cantilevered arm 123 might be rounded. Other shapes are possible. For example, in some embodiments, the anchor may be limited to a region near the center of the actuator. In some such embodiments, the actuator may be symmetric around the anchor. For example, anchor 160 and actuator 120 may have a circular footprint. Such an actuator may be configured to vibrate in a manner analogous to a jellyfish or similar to the opening/closing of an umbrella. In some embodiments, the entire perimeter of such an actuator vibrates in-phase (e.g. all move up or down together). In other embodiments, portions of the perimeter of such an actuator vibrate out-of-phase.

Actuator 120 may be driven at a frequency that is at or near both the resonant frequency for an acoustic resonance of a pressure wave of the fluid in top chamber 140 and the resonant frequency for a structural resonance of actuator 120. The portion of actuator 120 undergoing vibrational motion (e.g. each cantilevered arm 123 having a length $(L-a)/2)$) is driven at or near resonance (the "structural resonance") of actuator 120. This portion of actuator 120 undergoing vibration may be cantilevered section 123 in some embodiments. The frequency of vibration for structural resonance is termed the structural resonant frequency. Use of the structural resonant frequency in driving actuator 120 reduces the power consumption of cooling system 100. Actuator 120 and top chamber 140 may also be configured such that this structural resonant frequency corresponds to a resonance in a pressure wave in the fluid being driven through top chamber 140 (the acoustic resonance of top chamber 140). The frequency of such a pressure wave is termed the acoustic resonant frequency. The nominal acoustic resonant frequency (the resonant frequency for cooling system 100 in the absence of features 170) can be calculated as follows. At acoustic resonance, a node in pressure occurs near vent 112 and an antinode in pressure occurs near the periphery of cooling system 100 (e.g. near tip 121 of actuator 120 and near the connection between top chamber 140 and bottom chamber 150). The distance between these two regions is C/2. In the absence of features 170, the distance between these two regions (roughly C/2) is the distance the fluid would travel in top chamber 140. Thus, $C/2=n\lambda/4$, where $\lambda$ is the acoustic wavelength for the fluid and n is odd (e.g. n=1, 3, 5, etc.) for cooling system 100 in the absence of features 170. The nominal acoustic resonant frequency for fluid chambers 140/150 is given by the speed of sound in the fluid divided by $\lambda$, or the speed of sound in the fluid divided by 2C/n. For the lowest order mode, $C=\lambda/2$. Because the length of chamber 140 (e.g. C) is close to the length of actuator 120, in some embodiments, it is also approximately true that $L/2=n\lambda/4$, where $\lambda$ is the acoustic wavelength for the fluid and n is odd. Thus, the frequency at which actuator 120 is driven, v, is at or near the structural resonant frequency for actuator 120. The frequency v is also at or near the nominal acoustic resonant frequency for at least top chamber 140 in the absence of features 170. The acoustic resonant frequency of top chamber 140 generally varies less dramatically with parameters such as temperature and size than the structural resonant frequency of actuator 120. Consequently, in some embodiments, actuator 120 may be driven at (or closer to) a structural resonant frequency than to the acoustic resonant frequency.

Orifice plate 130 has orifices 132 therein. Although a particular number and distribution of orifices 132 are shown, another number and/or another distribution may be used. A single orifice plate 130 is used for a single cooling system 100. In other embodiments, multiple cooling systems 100 may share an orifice plate. For example, multiple cells 100 may be provided together in a desired configuration. In such embodiments, the cells 100 may be the same size and configuration or different size(s) and/or configuration(s). Orifices 132 are shown as having an axis oriented normal to a surface of heat-generating structure 102. In other embodiments, the axis of one or more orifices 132 may be at another angle. For example, the angle of the axis may be selected from substantially zero degrees and a nonzero acute angle. Orifices 132 also have sidewalls that are substantially parallel to the normal to the surface of orifice plate 130. In some embodiments, orifices may have sidewalls at a nonzero angle to the normal to the surface of orifice plate 130. For example, orifices 132 may be cone-shaped. Further, although orifice place 130 is shown as substantially flat, in some embodiments, trenches and/or other structures may be provided in orifice plate 130 to modify the configuration of bottom chamber 150 and/or the region between orifice plate 130 and heat-generating structure 102.

The size, distribution and locations of orifices 132 are chosen to control the flow rate of fluid driven to the surface of heat-generating structure 102. The locations and configurations of orifices 132 may be configured to increase/maximize the fluid flow from bottom chamber 150 through orifices 132 to the jet channel (the region between the bottom of orifice plate 130 and the top of heat-generating structure 102). The locations and configurations of orifices 132 may also be selected to reduce/minimize the suction flow (e.g. back flow) from the jet channel through orifices 132. For example, the locations of orifices are desired to be sufficiently far from tip 121 that suction in the upstroke of actuator 120 (tip 121 moves away from orifice plate 13) that would pull fluid into bottom chamber 150 through orifices 132 is reduced. The locations of orifices are also desired to be sufficiently close to tip 121 that suction in the upstroke of actuator 120 also allows a higher pressure from top chamber 140 to push fluid from top chamber 140 into bottom chamber 150. In some embodiments, the ratio of the flow rate from top chamber 140 into bottom chamber 150 to the flow rate from the jet channel through orifices 132 in the upstroke (the "net flow ratio") is greater than 2:1. In some embodiments, the net flow ratio is at least 85:15. In some embodiments, the net flow ratio is at least 90:10. In order to provide the desired pressure, flow rate, suction, and net flow ratio, orifices 132 are desired to be at least a distance, r1, from tip 121 and not more than a distance, r2, from tip 121 of actuator 120. In some embodiments r1 is at least one hundred micrometers (e.g. r1≥100 µm) and r2 is not more than one millimeter (e.g. r2≤1000 µm). In some embodiments, orifices 132 are at least two hundred micrometers from tip 121 of actuator 120 (e.g. r1≥200 µm). In some such embodiments, orifices 132 are at least three hundred micrometers from tip 121 of actuator 120 (e.g. r1≥300 µm). In some embodiments, orifices 132 have a width, o, of at least one hundred micrometers and not more than five hundred micrometers. In some embodiments, orifices 132 have a width of at least two hundred micrometers and not more than three hundred micrometers. In some embodiments, the orifice separation, s, is at least one hundred micrometers and not more than one millimeter. In some such embodiments, the orifice separation is at least four hundred micrometers and not more than six hundred micrometers. In some embodiments, orifices 132 are also desired to occupy a particular fraction of the area of orifice plate 130. For example, orifices 132 may cover at least five percent and not more than fifteen percent of the footprint of orifice plate 130 in order to achieve a desired flow rate of fluid through orifices 132. In some embodiments, orifices 132 cover at least eight percent and not more than twelve percent of the footprint of orifice plate 130.

In some embodiments, cooling system 100 includes chimneys (not shown) or other ducting. Such ducting provides a path for heated fluid to flow away from heat-generating structure 102. In some embodiments, ducting returns fluid to the side of top plate 110 distal from heat-generating structure 102. In some embodiments, ducting may instead direct fluid away from heat-generating structure 102 in a direction parallel to heat-generating structure 102 or perpendicular to heat-generating structure 102 but in the opposite direction (e.g. toward the bottom of the page). For a device in which fluid external to the device is used in cooling system 100, the ducting may channel the heated fluid to a vent. In such embodiments, additional fluid may be provided from an inlet vent. In embodiments, in which the device is enclosed, the ducting may provide a circuitous path back to the region near vent 112 and distal from heat-generating structure 102. Such a path allows for the fluid to dissipate heat before being reused to cool heat-generating structure 102. In other embodiments, ducting may be omitted or configured in another manner. Thus, the fluid is allowed to carry away heat from heat-generating structure 102.

Figure 1C:
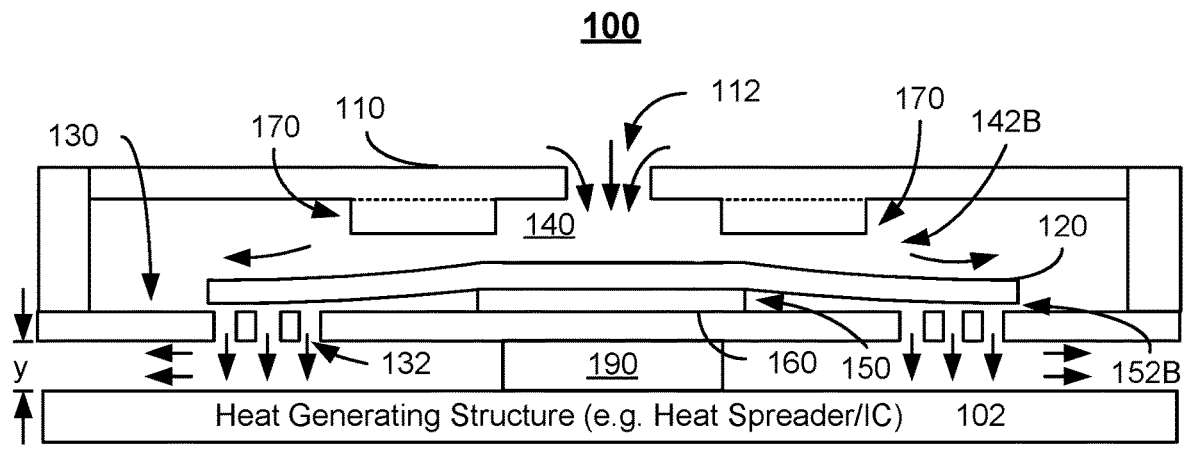
Figure 1D:
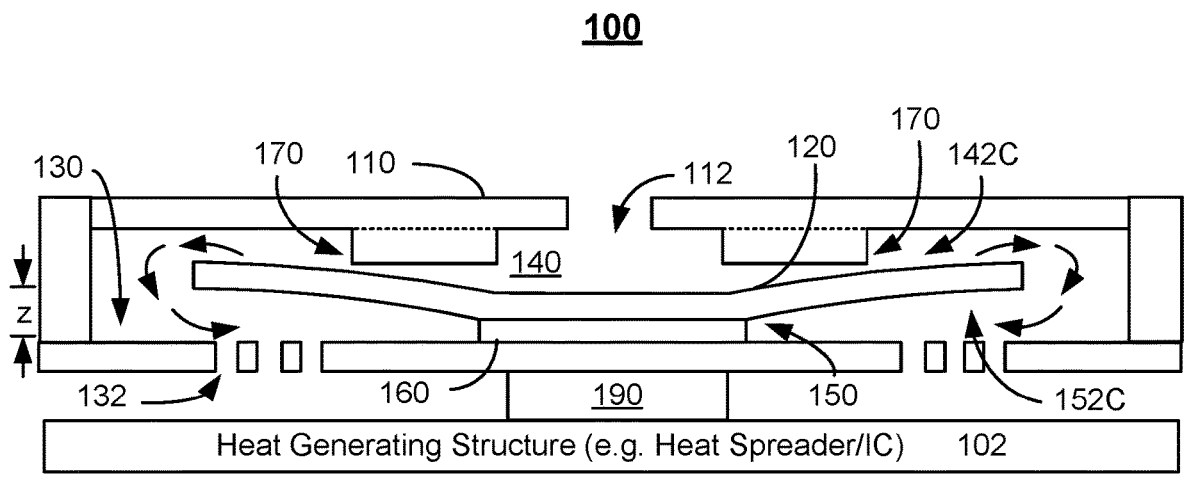

Operation of cooling system 100 is described in the context of FIGS. 1A-1G. Although described in the context of particular pressures, gap sizes, and timing of flow, operation of cooling system 100 is not dependent upon the explanation herein. FIGS. 1C-1D depict in-phase operation of cooling system 100. Referring to FIG. 1C, actuator 120 has been actuated so that its tip 121 moves away from top plate 110. FIG. 1C can thus be considered to depict the end of a down stroke of actuator 120. Because of the vibrational motion of actuator 120, gap 152 for bottom chamber 150 has decreased in size and is shown as gap 152B. Conversely, gap 142 for top chamber 140 has increased in size and is shown as gap 142B. During the down stroke, a lower (e.g. minimum) pressure is developed at the periphery when actuator 120 is at the neutral position. As the down stroke continues, bottom chamber 150 decreases in size and top chamber 140 increases in size as shown in FIG. 1C. Thus, fluid is driven out of orifices 132 in a direction that is at or near perpendicular to the surface of orifice plate 130 and/or the top surface of heat-generating structure 102. The fluid is driven from orifices 132 toward heat-generating structure 102 at a high speed, for example in excess of thirty-five meters per second. In some embodiments, the fluid then travels along the surface of heat-generating structure 102 and toward the periphery of heat-generating structure 102, where the pressure is lower than near orifices 132. Also in the down stroke, top chamber 140 increases in size and a lower pressure is present in top chamber 140. As a result, fluid is drawn into top chamber 140 through vent 112. The motion of the fluid into vent 112, through orifices 132, and along the surface of heat-generating structure 102 is shown by unlabeled arrows in FIG. 1C.

Actuator 120 is also actuated so that tip 121 moves away from heat-generating structure 102 and toward top plate 110. FIG. D can thus be considered to depict the end of an up stroke of actuator 120. Because of the motion of actuator 120, gap 142 has decreased in size and is shown as gap 142C. Gap 152 has increased in size and is shown as gap 152C. During the upstroke, a higher (e.g. maximum) pressure is developed at the periphery when actuator 120 is at the neutral position. As the upstroke continues, bottom chamber 150 increases in size and top chamber 140 decreases in size as shown in FIG. 1D. Thus, the fluid is driven from top chamber 140 (e.g. the periphery of chamber 140/150) to bottom chamber 150. Thus, when tip 121 of actuator 120 moves up, top chamber 140 serves as a nozzle for the entering fluid to speed up and be driven towards bottom chamber 150. The motion of the fluid into bottom chamber 150 is shown by unlabeled arrows in FIG. 1D. The location and configuration of actuator 120 and orifices 132 are selected to reduce suction and, therefore, back flow of fluid from the jet channel (between heat-generating structure 102 and orifice plate 130) into orifices 132 during the upstroke. Thus, cooling system 100 is able to drive fluid from top chamber 140 to bottom chamber 150 without an undue amount of backflow of heated fluid from the jet channel entering bottom chamber 140. Moreover, cooling system 100 may operate such that fluid is drawn in through vent 112 and driven out through orifices 132 without actuator 120 contacting top plate 110 or orifice plate 130. Thus, pressures are developed within chambers 140 and 150 that effectively open and close vent 112 and orifices 132 such that fluid is driven through cooling system 100 as described herein.

The motion between the positions shown in FIGS. 1C and 1D is repeated. Thus, actuator 120 undergoes vibrational motion indicated in FIGS. 1C-1D, drawing fluid through vent 112 from the distal side of top plate 110 into top chamber 140; transferring fluid from top chamber 140 to bottom chamber 150; and pushing the fluid through orifices 132 and toward heat-generating structure 102. As discussed above, actuator 120 is driven to vibrate at or near the structural resonant frequency of actuator 120. Further, the structural resonant frequency of actuator 120 is configured to align with the acoustic resonance of the chamber 140/150. The structural and acoustic resonant frequencies are generally chosen to be in the ultrasonic range. For example, the vibrational motion of actuator 120 may be at frequencies from 15 kHz through 30 kHz. In some embodiments, actuator 120 vibrates at a frequency/frequencies of at least 20 kHz and not more than 30 kHz (e.g. 23 kHz-25 kHz). The structural resonant frequency of actuator 120 is within ten percent of the acoustic resonant frequency of cooling system 100. In some embodiments, the structural resonant frequency of actuator 120 is within five percent of the acoustic resonant frequency of cooling system 100. In some embodiments, the structural resonant frequency of actuator 120 is within three percent of the acoustic resonant frequency of cooling system 100. Consequently, efficiency and flow rate may be enhanced. However, other frequencies may be used.

Fluid driven toward heat-generating structure 102 may move substantially normal (perpendicular) to the top surface of heat-generating structure 102. In some embodiments, the fluid motion may have a nonzero acute angle with respect to the normal to the top surface of heat-generating structure 102. In either case, the fluid may thin and/or form apertures in the boundary layer of fluid at heat-generating structure 102. As a result, transfer of heat from heat-generating structure 102 may be improved. The fluid deflects off of heat-generating structure 102, traveling along the surface of heat-generating structure 102. In some embodiments, the fluid moves in a direction substantially parallel to the top of heat-generating structure 102. Thus, heat from heat-generating structure 102 may be extracted by the fluid. The fluid may exit the region between orifice plate 130 and heat-generating structure 102 at the edges of cooling system 100. Chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to distal side of top plate 110 after cooling. In other embodiments, heated fluid is carried away and replaced by new fluid at the distal side of actuator 120. As a result, heat-generating structure 102 may be cooled.

Figure 1E:
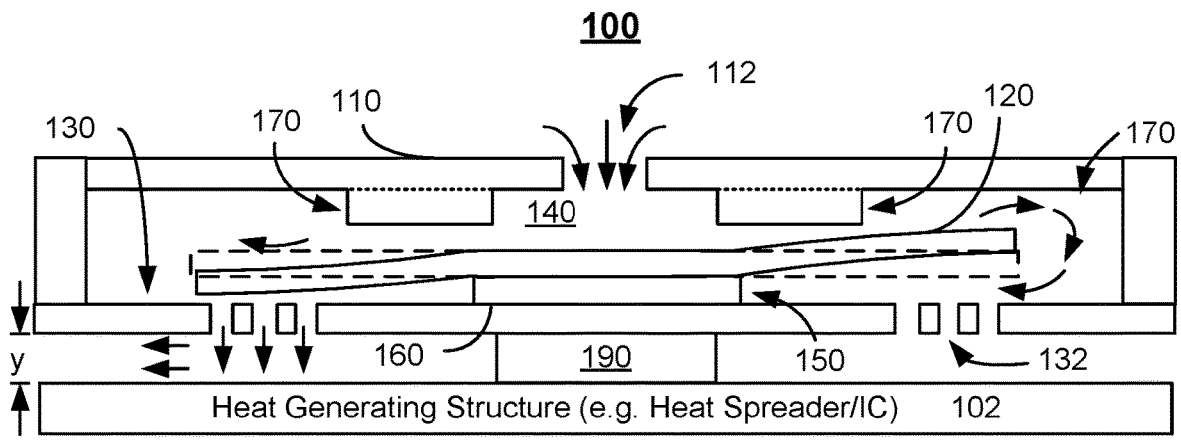
Figure 1F:
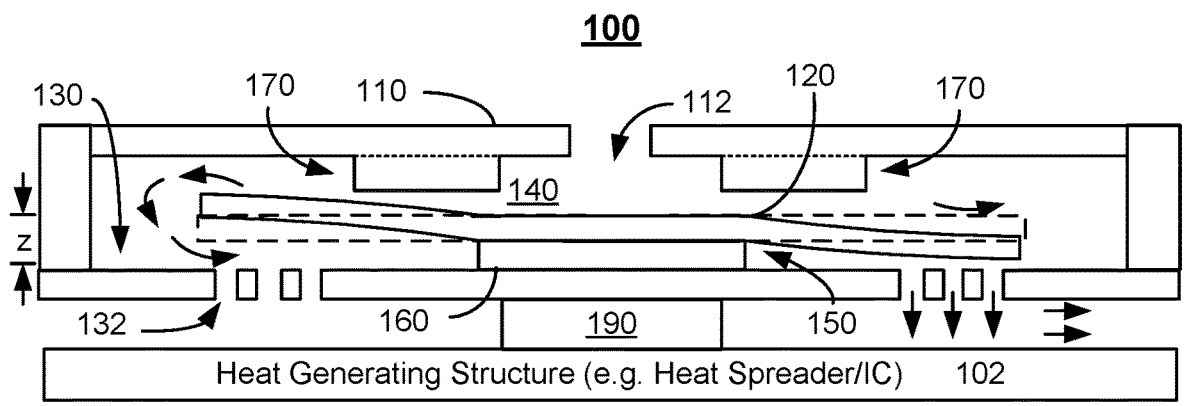

FIGS. 1E-1F depict an embodiment of active MEMS cooling system 100 including centrally anchored actuator 120 in which the actuator is driven out-of-phase. More specifically, sections of actuator 120 on opposite sides of anchor 160 (and thus on opposite sides of the central region of actuator 120 that is supported by anchor 160) are driven to vibrate out-of-phase. In some embodiments, sections of actuator 120 on opposite sides of anchor 160 are driven at or near one hundred and eighty degrees out-of-phase. Thus, one section of actuator 120 vibrates toward top plate 110, while the other section of actuator 120 vibrates toward orifice plate 130/heat-generating structure 102. Movement of a section of actuator 120 toward top plate 110 (an upstroke) drives fluid in top chamber 140 to bottom chamber 150 on that side of anchor 160. Movement of a section of actuator 120 toward orifice plate 130 drives fluid through orifices 132 and toward heat-generating structure 102. Thus, fluid traveling at high speeds (e.g. speeds described with respect to in-phase operation) is alternately driven out of orifices 132 on opposing sides of anchor 160. Because fluid is driven through orifices 132 at high speeds, cooling system 100 may be viewed as a MEMS jet. The movement of fluid is shown by unlabeled arrows in FIGS. 1E and 1F.

The motion between the positions shown in FIGS. 1E and 1F is repeated. Thus, actuator 120 undergoes vibrational motion indicated in FIGS. 1A, 1E, and 1F, alternately drawing fluid through vent 112 from the distal side of top plate 110 into top chamber 140 for each side of actuator 120; transferring fluid from each side of top chamber 140 to the corresponding side of bottom chamber 150; and pushing the fluid through orifices 132 on each side of anchor 160 and toward heat-generating structure 102. As discussed above, actuator 120 is driven to vibrate at or near the structural resonant frequency of actuator 120. Further, the structural resonant frequency of actuator 120 is configured to align with the acoustic resonance of the chamber 140/150. The structural and acoustic resonant frequencies are generally chosen to be in the ultrasonic range. For example, the vibrational motion of actuator 120 may be at the frequencies described for in-phase vibration. The structural resonant frequency of actuator 120 is within ten percent of the acoustic resonant frequency of cooling system 100. In some embodiments, the structural resonant frequency of actuator 120 is within five percent of the acoustic resonant frequency of cooling system 100. In some embodiments, the structural resonant frequency of actuator 120 is within three percent of the acoustic resonant frequency of cooling system 100. Consequently, efficiency and flow rate may be enhanced. However, other frequencies may be used.

Fluid driven toward heat-generating structure 102 for out-of-phase vibration may move substantially normal (perpendicular) to the top surface of heat-generating structure 102, in a manner analogous to that described above for in-phase operation. Similarly, chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to distal side of top plate 110 after cooling. In other embodiments, heated fluid is carried away and replaced by new fluid at the distal side of actuator 120. As a result, heat-generating structure 102 may be cooled.

As discussed above, actuator 120 may be driven at a frequency that is at or near both the resonant frequency for an acoustic resonance of a pressure wave of the fluid in top chamber 140 and the resonant frequency for a structural resonance of actuator 120. At acoustic resonance, an antinode in pressure occurs near the periphery of cooling system 100. Although the node in pressure occurs near vent 112, the exact location of the node may differ based upon various factors. Differences in the location of the node and/or antinode result in different acoustic resonant frequencies. For example, depending upon whether cantilevered arms 123 vibrate in-phase (FIGS. 1C-1D) or out-of-phase (FIGS. 1E-1F) the location of the node differs. If cantilevered arms 123 of actuator 120 are driven in-phase, the in-phase motion of cantilevered arms 123 may increase the pressure near vent 112 (e.g. near the center of cooling system 100). Thus, the location of the pressure node may be outside of vent 112/outside of top chamber 140. The precise location of the node may depend upon the characteristics of the fluid outside of vent 112 (i.e. the fluid reservoir). If cantilevered arms 123 of actuator 120 are driven out-of-phase, the in phase motion of cantilevered arms 123 may not change the pressure near vent 112. Thus, the node may remain at or near vent 112. The location of the pressure node may thus be independent of the characteristics of the fluid reservoir. As a result, the distance between the node and the antinode in pressure for actuator 120 being driven in-phase is larger than for the actuator being driven out-of-phase. Consequently, the acoustic resonant frequency for cantilevered arms 123 being driven out-of-phase is higher than for cantilevered arms 123 being driven in-phase. For example, for acoustic and structural resonant frequencies being in the range of 20 kHz-25 kHz, the acoustic resonant frequency for out-of-phase vibration of cantilevered arms 123 may be 3 kHz-4 kHz (e.g. nominally 3.5 kHz) higher than for in-phase vibration. Thus, the acoustic resonant frequency may be desired to be further tailed, for example to more closely match the structural resonant frequency and/or to improve fluid flow.

Features 170 in flow chamber 140/150 may allow for tailoring of the acoustic resonant frequency. Features 170 obstruct the flow of fluid in top chamber 140. Because the features 170 protrude from top plate 110, the distance between features 170 and actuator 120 is smaller than for remaining portions of top plate 110. As a result, fluid tends to flow around features 170. For example, in some embodiments, features 170 are sufficiently tall that at least sixty percent of the fluid flows around features 170 instead of between features 170 and actuator 120. In some embodiments, at least seventy-five percent of the fluid flows around features 170. In some embodiments, at least eighty percent of the fluid flows around features 170. In some embodiments, not more than ninety-five percent of the fluid flows around features 170. For example, at least eighty and not more than eighty five percent of the fluid flows around features 170. This may occur, for example, for a top cavity height h1 of three hundred micrometers and a feature height u of two hundred and fifty micrometers (e.g. a gap between features 170 and actuator 120 of fifty micrometers). Other heights and/or other fractions are possible.

Figure 1G:
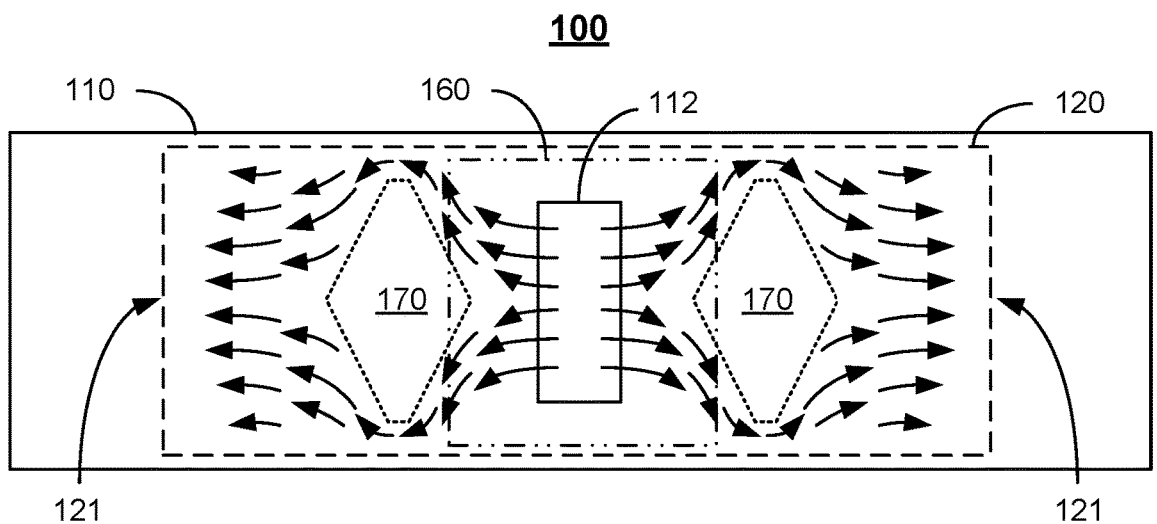

This fluid flow may be seen in FIG. 1G. The unlabeled arrows of FIG. 1G indicate the direction of flow of the majority (e.g. eighty to eighty-five percent of the fluid) while actuator 120 is driven. Because of the presence of features 170, the fluid does not follow a straight path from vent 112 to tip 121 of actuator 120 and into bottom chamber 150. Features 170 thus obstruct the flow of fluid in top chamber 140. The path taken by the fluid around features 170 is different from the length of the portion of top chamber 140 (C/2) and different from the length of the portion of actuator 120 (L/2). Features 170 thus increase an effective length for top chamber 140. Consequently, the effective length of the path traveled by the fluid between the node (e.g. at or near vent 112) and the antinode (near the edge of chamber 140/150) has been increased by the presence of features 170. The increase in the effective length of top chamber 140 modifies the wavelength of the standing pressure wave in cooling system 100 and, therefore, the acoustic (or fluidic) resonant frequency. Thus, the presence of features 170 may reduce the fluidic resonant frequency to be less than a nominal fluidic resonant frequency of top chamber 140 in the absence of features 170. Further, the combination of the length (v1) and width (v2) of features 170 may be selected to provide the desired effective path of the fluid being driven. Thus, desired acoustic resonant frequency may be obtained. Although the presence of features 170 may restrict flow somewhat, in some embodiments, features 170 are configured such that flow is not significantly changed. For example, in various embodiments, the flow rate may drop by not more than five percent, ten percent, fifteen percent or twenty percent. Thus, adequate flow for cooling may be maintained while tailoring the frequency.

Figure 1H:
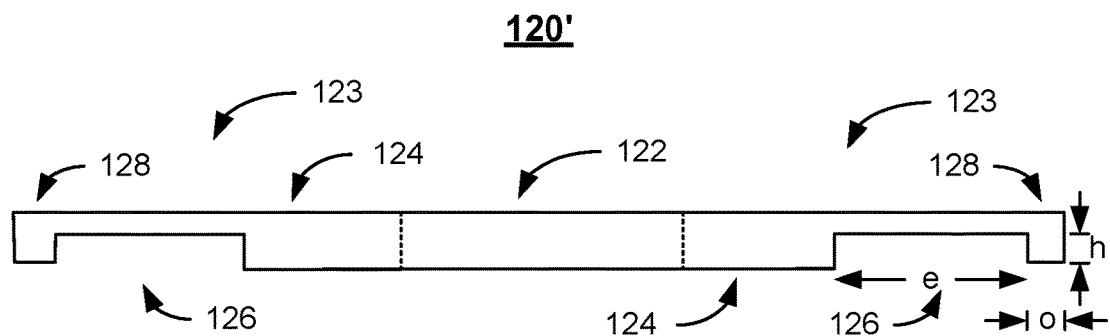

Although shown in the context of a uniform actuator in FIGS. 1A-1G, cooling system 100 may utilize actuators having different shapes. FIG. 1H depicts an embodiment of engineered actuator 120' having a tailored geometry and usable in a cooling system such as cooling system 100. Actuator 120' includes an anchored region 122 and cantilevered arms 123. Anchored region 122 is supported (e.g. held in place) in cooling system 100 by anchor 160. Cantilevered arms 123 undergo vibrational motion in response to actuator 120' being actuated. Each cantilevered arm 123 includes step region 124, extension region 126 and outer region 128. In the embodiment shown in FIG. 1H, anchored region 122 is centrally located. Step region 124 extends outward from anchored region 122. Extension region 126 extends outward from step region 124. Outer region 128 extends outward from extension region 126. In other embodiments, anchored region 122 may be at one edge of the actuator and outer region 128 at the opposing edge. In such embodiments, the actuator is edge anchored.

Extension region 126 has a thickness (extension thickness) that is less than the thickness of step region 124 (step thickness) and less than the thickness of outer region 128 (outer thickness). Thus, extension region 126 may be viewed as recessed. Extension region 126 may also be seen as providing a larger bottom chamber 150. In some embodiments, the outer thickness of outer region 128 is the same as the step thickness of step region 124. In some embodiments, the outer thickness of outer region 128 is different from the step thickness of step region 124. In some embodiments, outer region 128 and step region 124 each have a thickness of at least three hundred twenty micrometers and not more than three hundred and sixty micrometers. In some embodiments, the outer thickness is at least fifty micrometers and not more than two hundred micrometers thicker than the extension thickness. Stated differently, the step (difference in step thickness and extension thickness) is at least fifty micrometers and not more than two hundred micrometers. In some embodiments, the outer step (difference in outer thickness and extension thickness) is at least fifty micrometers and not more than two hundred micrometers. Outer region 128 may have a width, o, of at least one hundred micrometers and not more than three hundred micrometers. Extension region has a length, e, extending outward from the step region of at least 0.5 millimeter and not more than 1.5 millimeters in some embodiments. In some embodiments, outer region 128 has a higher mass per unit length in the direction from anchored region 122 than extension region 126. This difference in mass may be due to the larger size of outer region 128, a difference in density between portions of actuator 120, and/or another mechanism.

Use of engineered actuator 120' may further improve efficiency of cooling system 100. Extension region 126 is thinner than step region 124 and outer region 128. This results in a cavity in the bottom of actuator 120' corresponding to extension region 126. The presence of this cavity aids in improving the efficiency of cooling system 100. Each cantilevered arm 123 vibrates towards top plate 110 in an upstroke and away from top plate 110 in a downstroke. When a cantilevered arm 123 moves toward top plate 110, higher pressure fluid in top chamber 140 resists the motion of cantilevered arm 123. Furthermore, suction in bottom chamber 150 also resists the upward motion of cantilevered arm 123 during the upstroke. In the downstroke of cantilevered arm 123, increased pressure in the bottom chamber 150 and suction in top chamber 140 resist the downward motion of cantilevered arm 123. However, the presence of the cavity in cantilevered arm 123 corresponding to extension region 126 mitigates the suction in bottom chamber 150 during an upstroke. The cavity also reduces the increase in pressure in bottom chamber 150 during a downstroke. Because the suction and pressure increase are reduced in magnitude, cantilevered arms 123 may more readily move through the fluid. This may be achieved while substantially maintaining a higher pressure in top chamber 140, which drives the fluid flow through cooling system 100. Moreover, the presence of outer region 128 may improve the ability of cantilevered arm 123 to move through the fluid being driven through cooling system 100. Outer region 128 has a higher mass per unit length and thus a higher momentum. Consequently, outer region 128 may improve the ability of cantilevered arms 123 to move through the fluid being driven through cooling system 100. The magnitude of the deflection of cantilevered arm 123 may also be increased. These benefits may be achieved while maintaining the stiffness of cantilevered arms 123 through the use of thicker step region 124. Further, the larger thickness of outer region 128 may aid in pinching off flow at the bottom of a downstroke. Thus, the ability of actuator 120' to provide a valve preventing backflow through orifices 132 may be improved. Thus, performance of cooling system 100 employing actuator 120' may be improved.

Further, cooling elements used in cooling system 100 may have different structures and/or be mounted differently than depicted in FIGS. 1A-1H. In some embodiments, the cooling element may have rounded corners and/or rounded ends but still be anchored along a central axis such that cantilevered arms vibrate. The cooling element may be anchored only at its central region such that the regions surrounding the anchor vibrate in a manner analogous to a jellyfish or the opening/closing of an umbrella. In some such embodiments, the cooling element may be circular or elliptical in shape. In some embodiments, the anchor may include apertures through which fluid may flow. Such an anchor may be utilized for the cooling element being anchored at its top (e.g. to the top plate). Although not indicated in FIGS. 1A-1H, the piezoelectric utilized in driving the cooling element may have various locations and/or configurations. For example, the piezoelectric may be embedded in the cooling element, affixed to one side of the cooling element (or cantilevered arm(s)), may occupy some or all of the cantilevered arms, and/or may have a location that is close to or distal from the anchored region. In some embodiments, cooling elements that are not centrally anchored may be used. For example, a pair of cooling elements that have offset apertures, that are anchored at their ends (or all edges), and which vibrate out of phase may be used. Thus, various additional configurations of cooling element 120 and/or 120', anchor 160, and/or other portions of cooling system 100 may be used.

Using the cooling system 100 actuated for in-phase vibration or out-of-phase vibration of actuator 120 and/or 120', fluid drawn in through vent 112 and driven through orifices 132 may efficiently dissipate heat from heat-generating structure 102. Because fluid impinges upon the heat-generating structure with sufficient speed (e.g. at least thirty meters per second) and in some embodiments substantially normal to the heat-generating structure, the boundary layer of fluid at the heat-generating structure may be thinned and/or partially removed. Consequently, heat transfer between heat-generating structure 102 and the moving fluid is improved. Because the heat-generating structure is more efficiently cooled, the corresponding integrated circuit may be run at higher speed and/or power for longer times. For example, if the heat-generating structure corresponds to a high-speed processor, such a processor may be run for longer times before throttling. Thus, performance of a device utilizing cooling system 100 may be improved. Further, cooling system 100 may be a MEMS device. Consequently, cooling systems 100 may be suitable for use in smaller and/or mobile devices, such as smart phones, other mobile phones, virtual reality headsets, tablets, two-in-one computers, wearables and handheld games, in which limited space is available. Performance of such devices may thus be improved. Because actuator 120/120' may be vibrated at frequencies of 15 kHz or more, users may not hear any noise associated with actuation of actuators. If driven at or near structural and/or acoustic resonant frequencies, the power used in operating cooling systems may be significantly reduced. Actuator 120/120' does not physically contact top plate 110 or orifice plate 130 during vibration. Thus, resonance of actuator 120/120' may be more readily maintained. More specifically, physical contact between actuator 120/120' and other structures disturbs the resonance conditions for actuator 120/120'. Disturbing these conditions may drive actuator 120/120' out of resonance. Thus, additional power would need to be used to maintain actuation of actuator 120/120'. Further, the flow of fluid driven by actuator 120/120' may decrease. These issues are avoided through the use of pressure differentials and fluid flow as discussed above. The benefits of improved, quiet cooling may be achieved with limited additional power. Further, out-of-phase vibration of actuator 120/120' allows the position of the center of mass of actuator 100 to remain more stable. Although a torque is exerted on actuator 120/120', the force due to the motion of the center of mass is reduced or eliminated. As a result, vibrations due to the motion of actuator 120/120' may be reduced. Moreover, efficiency of cooling system 100 may be improved through the use of out-of-phase vibrational motion for the two sides of actuator 120/120'. Consequently, performance of devices incorporating the cooling system 100 may be improved. Further, cooling system 100 may be usable in other applications (e.g. with or without heat-generating structure 102) in which high fluid flows and/or velocities are desired.

In addition to improved cooling performance, cooling system 100 has an acoustic (or fluidic) resonant frequency that can be tailored. The shape, height, footprint (e.g. length and width) of features 170 may be selected to provide the desired increase in distance traveled by fluid driven by vibration of actuator 120. As a result, the acoustic resonant frequency of cooling system 100 may be tuned. For example, the acoustic resonant frequency may be tailored to better match the structural resonant frequency of actuator 120, to provide improved thermal dissipation by the fluid driven by actuator 120, and/or for other purposes.

Figure 2:
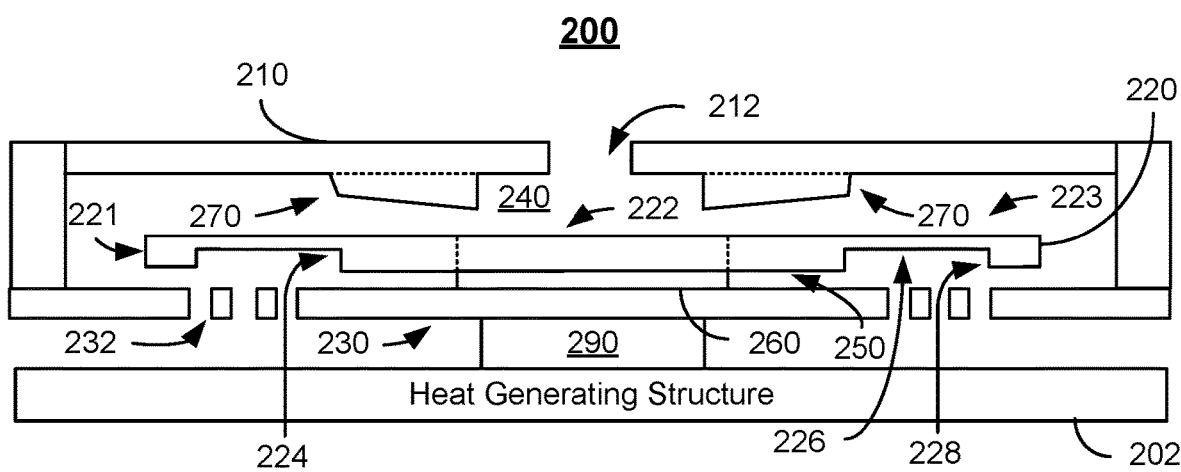
FIG. 2 depicts an embodiment of an active cooling system including an actuator and features in the upper chamber.

FIG. 2 depicts an embodiment of active MEMS cooling system 200 including a centrally anchored, engineered actuator. FIG. 2 is not to scale. For simplicity, only portions of cooling system 200 are shown. Cooling system 200 is analogous to cooling system 100. Consequently, analogous components have similar labels. For example, cooling system 200 is used in conjunction with heat-generating structure 202, which is analogous to heat-generating structure 102. Cooling system 200 includes top plate 210 having vent 212, actuator 220, orifice plate 230 including orifices 232, top chamber 240 having a gap, bottom chamber 250 having a gap, flow chamber 240/250, anchor (i.e. support structure) 260, pedestal 290, and features 270 that are analogous to top plate 110 having vent 112, actuator 120, orifice plate 130 including orifices 132, top chamber 140 having gap 142, bottom chamber 150 having gap 152, flow chamber 140/150, anchor (i.e. support structure) 160, pedestal 190, and features 170, respectively. Thus, actuator 220 is centrally supported by anchor 260 such that at least a portion of the perimeter of actuator 220 is free to vibrate. Actuator 220 includes an anchored region 222, cantilevered arms 223, and tips 221 that are analogous to anchored region 122, cantilevered arms 123, and tips 121. Actuator 220 also includes step region 224, extension region 226, and outer region 228 that are analogous to step region 124, extension region 126, and outer region 128, respectively, of actuator 120'. Thus, cooling system 200 expressly integrates engineered actuator 220.

In addition, active cooling system 200 includes features 270, which protrude from the surface of top plate 210 into top chamber 240. Features 270 are analogous to features 170 of cooling system 100. Thus, features 270 obstruct the direct flow of the fluid within top chamber 240 and increase the effective length for top chamber 240. Thus, the acoustic resonant frequency for cooling system 200 is less than a nominal fluidic resonant frequency that would exist for top chamber 240 in the absence of features 270. Moreover, the surface of features closest to actuator 220 is not parallel to the remaining surface of top plate 210 facing actuator 220. Thus, the height of features 270 may vary while still allowing for tuning of the acoustic resonant frequency of cooling system 200.

Cooling system 200 operates in an analogous manner to cooling system 100. Cooling system 200 thus shares the benefits of cooling system 100. Thus, performance of a device employing cooling system 200 may be improved. As for cooling system 100, the presence of features 270 allows for tailoring of the acoustic resonant frequency. Thus, the performance may be improved.

Figure 3:
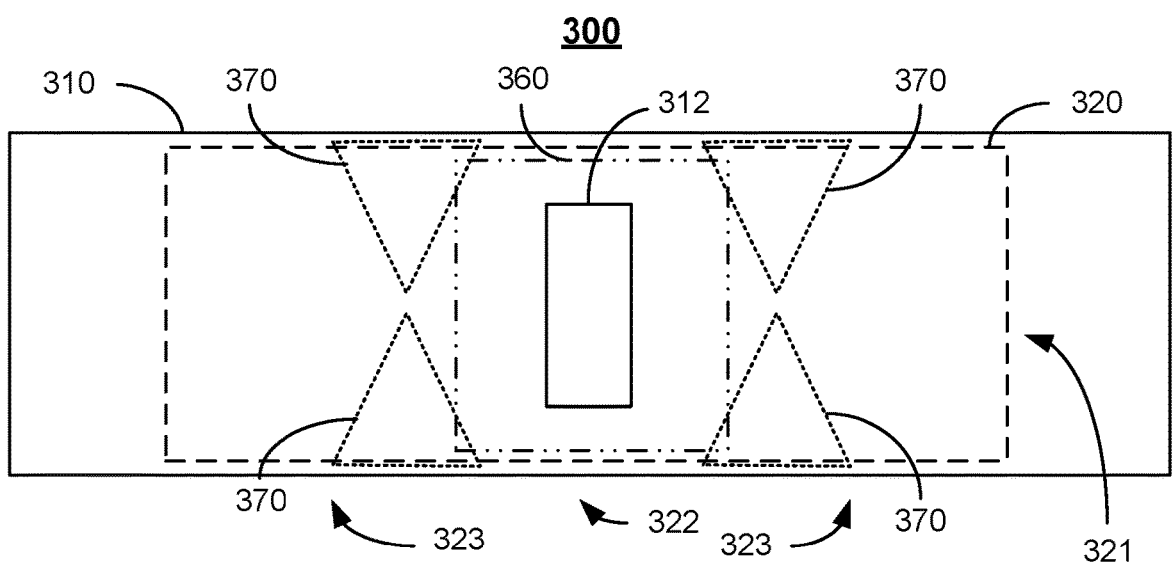
FIG. 3 depicts another embodiment of an active cooling system including an actuator and features in the upper chamber.

FIG. 3 depicts an embodiment of active MEMS cooling system 300. For simplicity, only a top view of cooling system 300 is shown. FIG. 3 is not to scale. For simplicity, only portions of cooling system 300 are shown. Cooling system 300 is analogous to cooling system(s) 100 and/or 200. Consequently, analogous components have similar labels. For example, cooling system 300 is used in conjunction with a heat-generating structure (not shown), which is analogous to heat-generating structure 102. Cooling system 300 includes top plate 310 having vent 312, actuator 320, orifice plate (not shown) including orifices (not shown), top chamber (not shown) having a gap, bottom chamber (not shown) having a gap, flow chamber (not shown), anchor (i.e. support structure) 360, and features 370 that are analogous to top plate 110 having vent 112, actuator 120, orifice plate 130 including orifices 132, top chamber 140 having gap 142, bottom chamber 150 having gap 152, flow chamber 140/150, anchor (i.e. support structure) 160, and features 170, respectively. Thus, actuator 320 is centrally supported by anchor 360 such that at least a portion of the perimeter of actuator 320 is free to vibrate. Actuator 320 includes an anchored region 322, cantilevered arms 323, and tips 321 that are analogous to anchored region 122, cantilevered arms 123, and tips 121. Although not indicated in FIG. 3, actuator 320 may be an engineered actuator analogous to actuator 120' and/or 220.

Features 370 protrude from the surface of top plate 310 into top chamber 340. Features 270 are analogous to features 170 of cooling system 100. Instead of being configured as diamonds, features 370 have a triangular footprint. Although shown with sharp corners, features 370 have rounded corners in some embodiments. The use of rounder corners may reduce or prevent the occurrence of vortices in the fluid flow. Thus, features 370 obstruct the direct flow of the fluid within the top chamber and increase the effective length for the top chamber. Thus, the acoustic resonant frequency for cooling system 300 is less than a nominal fluidic resonant frequency that would exist for cooling system 300 in the absence of features 370.

Cooling system 300 operates in an analogous manner to cooling system 100. Cooling system 300 thus shares the benefits of cooling system 100. Thus, performance of a device employing cooling system 300 may be improved. As in cooling system 100, the presence of features 370 allows for tailoring of the acoustic resonant frequency. Thus, the performance may be improved.

Figure 4:
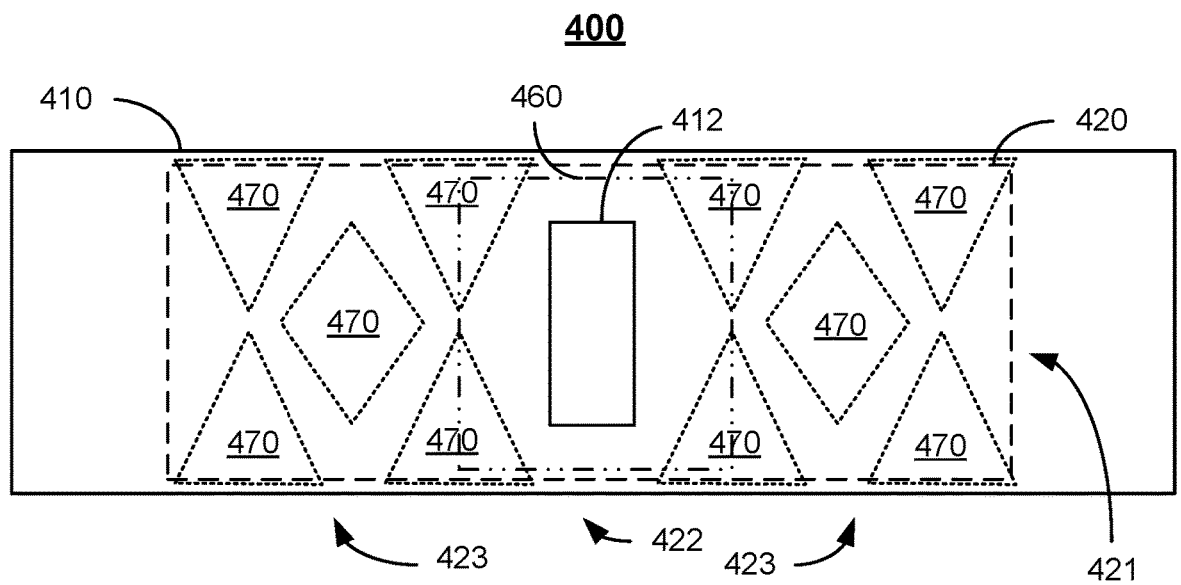
FIG. 4 depicts an embodiment of an active cooling system including an actuator and features in the upper chamber.

FIG. 4 depicts an embodiment of active MEMS cooling system 400. For simplicity, only a top view of cooling system 400 is shown. FIG. 4 is not to scale. For simplicity, only portions of cooling system 400 are shown. Cooling system 400 is analogous to cooling system(s) 100, 200 and/or 300. Consequently, analogous components have similar labels. For example, cooling system 400 is used in conjunction with a heat-generating structure (not shown), which is analogous to heat-generating structure 102. Cooling system 400 includes top plate 410 having vent 412, actuator 420, orifice plate (not shown) including orifices (not shown), top chamber (not shown) having a gap, bottom chamber (not shown) having a gap, flow chamber (not shown), anchor (i.e. support structure) 460, and features 470 that are analogous to top plate 110 having vent 112, actuator 120, orifice plate 130 including orifices 132, top chamber 140 having gap 142, bottom chamber 150 having gap 152, flow chamber 140/150, anchor (i.e. support structure) 160, and features 170, respectively. Thus, actuator 420 is centrally supported by anchor 460 such that at least a portion of the perimeter of actuator 420 is free to vibrate. Actuator 420 includes an anchored region 422, cantilevered arms 423, and tips 321 that are analogous to anchored region 122, cantilevered arms 123, and tips 121. Although not indicated in FIG. 4, actuator 420 may be an engineered actuator analogous to actuator 120' and/or 220.

Features 470 protrude from the surface of top plate 410 into top chamber 440. Features 470 are analogous to features 170 of cooling system 100. Features 470 include those with diamond and triangular footprints. Although shown with sharp corners, features 470 have rounded corners in some embodiments. The use of rounder corners may reduce or prevent the occurrence of vortices in the fluid flow. Thus, features 470 obstruct the direct flow of the fluid within the top chamber and increase the effective length for the top chamber. Thus, the acoustic resonant frequency for cooling system 400 is less than a nominal fluidic resonant frequency that would exist for cooling system 400 in the absence of features 470.

Cooling system 400 operates in an analogous manner to cooling system 100. Cooling system 400 thus shares the benefits of cooling system 100. Thus, performance of a device employing cooling system 400 may be improved. Further, the presence of features 470 allows for tailoring of the acoustic resonant frequency. Thus, the performance may be improved.

Figure 5:
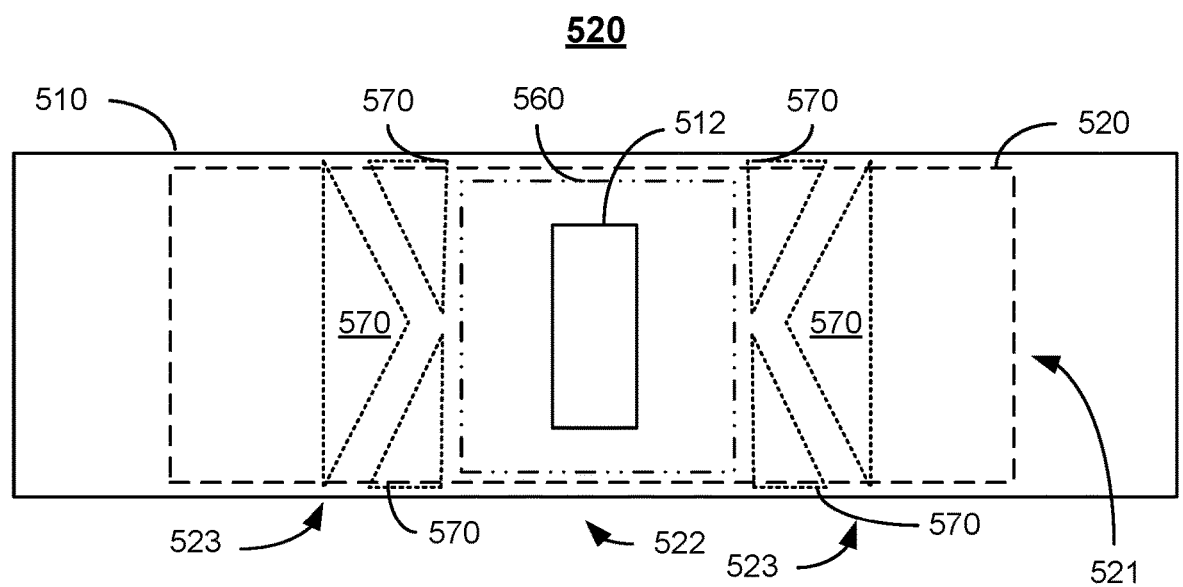
FIG. 5 depicts an embodiment of an active cooling system including an actuator and features in the upper chamber.

FIG. 5 depicts an embodiment of active MEMS cooling system 500. For simplicity, only a top view of cooling system 400 is shown. FIG. 5 is not to scale. For simplicity, only portions of cooling system 500 are shown. Cooling system 500 is analogous to cooling system(s) 100, 200, 300 and/or 400. Consequently, analogous components have similar labels. For example, cooling system 500 is used in conjunction with a heat-generating structure (not shown), which is analogous to heat-generating structure 102. Cooling system 500 includes top plate 510 having vent 512, actuator 520, orifice plate (not shown) including orifices (not shown), top chamber (not shown) having a gap, bottom chamber (not shown) having a gap, flow chamber (not shown), anchor (i.e. support structure) 560, and features 570 that are analogous to top plate 110 having vent 112, actuator 120, orifice plate 130 including orifices 132, top chamber 140 having gap 142, bottom chamber 150 having gap 152, flow chamber 140/150, anchor (i.e. support structure) 160, and features 170, respectively. Thus, actuator 520 is centrally supported by anchor 560 such that at least a portion of the perimeter of actuator 520 is free to vibrate. Actuator 520 includes an anchored region 522, cantilevered arms 523, and tips 521 that are analogous to anchored region 122, cantilevered arms 123, and tips 121. Although not indicated in FIG. 5, actuator 520 may be an engineered actuator analogous to actuator 120' and/or 220.

Features 570 protrude from the surface of top plate 510 into top chamber 540. Features 570 are analogous to features 170 of cooling system 100. Features 570 are configured to further restrict the path taken by fluid through cooling system 520. Although shown with sharp corners, features 570 have rounded corners in some embodiments. The use of rounder corners may reduce or prevent the occurrence of vortices in the fluid flow. Thus, features 570 obstruct the direct flow of the fluid within the top chamber and increase the effective length for the top chamber. In particular, fluid takes a path between features 570. Thus, the acoustic resonant frequency for cooling system 500 is less than a nominal fluidic resonant frequency that would exist for cooling system 500 in the absence of features 570.

Cooling system 500 operates in an analogous manner to cooling system 100. Cooling system 500 thus shares the benefits of cooling system 100. Thus, performance of a device employing cooling system 500 may be improved. Further, the presence of features 570 allows for tailoring of the acoustic resonant frequency. Thus, the performance may be improved.

Figure 6A:
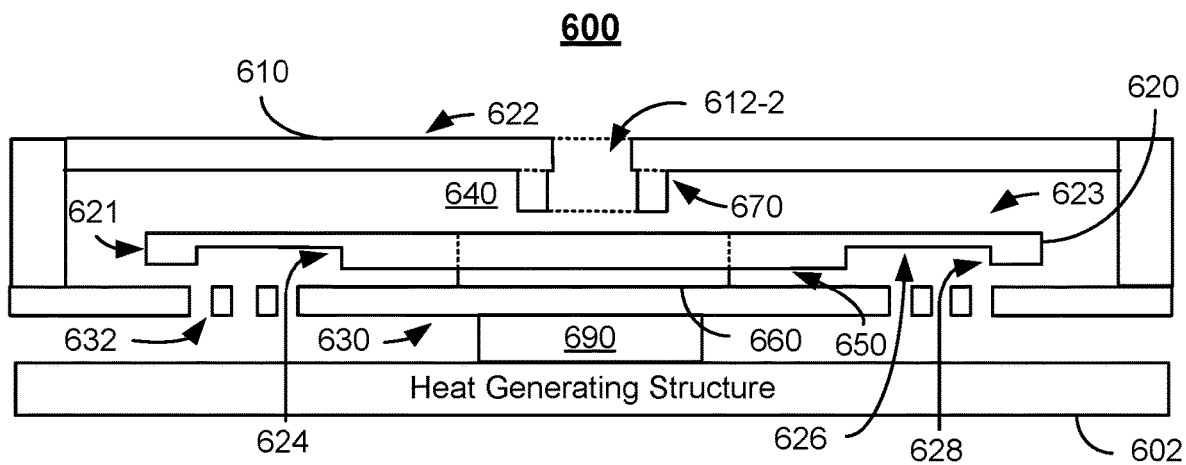
FIGS. 6A-6B depict an embodiment of an active cooling system including an actuator and features in the upper chamber including a split vent.
Figure 6B:
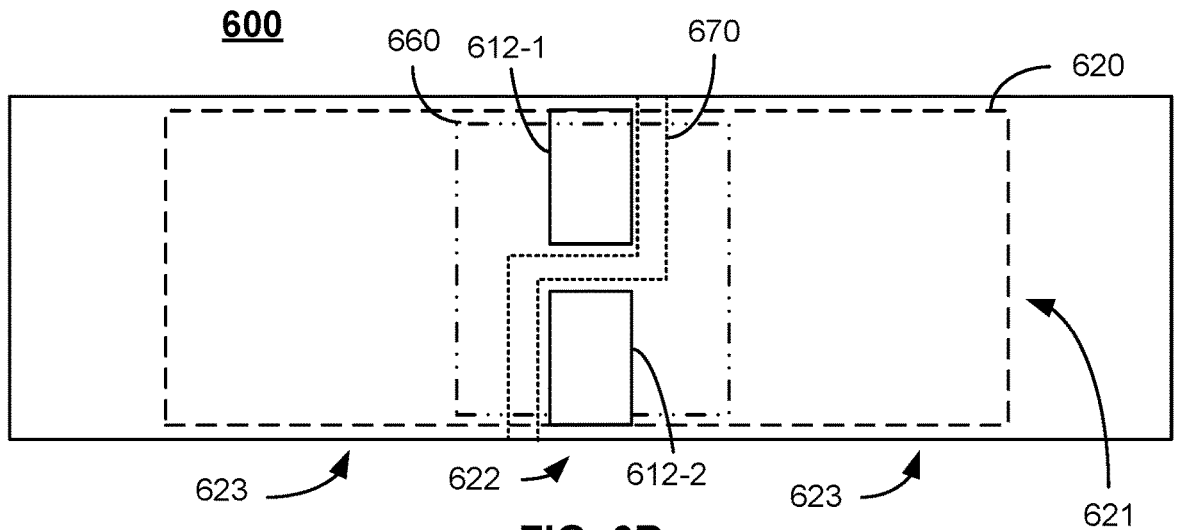

FIGS. 6A-6B depict an embodiment of active MEMS cooling system 600. FIG. 6A depicts a side view, while FIG. 6B depicts a top view. FIGS. 6A-6B are not to scale. For simplicity, only portions of cooling system 600 are shown. Cooling system 600 is analogous to cooling system(s) 100, 200, 300, 400 and/or 500. Consequently, analogous components have similar labels. For example, cooling system 600 is used in conjunction with a heat-generating structure (not shown), which is analogous to heat-generating structure 102. Cooling system 600 includes top plate 610, actuator 620, orifice plate 630 including orifices 632, top chamber 640 having a gap, bottom chamber 650 having a gap, flow chamber 640/650, anchor (i.e. support structure) 660, pedestal 690, and feature 670 that are analogous to top plate 110, actuator 120, orifice plate 130 including orifices 132, top chamber 140 having gap 142, bottom chamber 150 having gap 152, flow chamber 140/150, anchor (i.e. support structure) 160, pedestal 190, and features 170, respectively. Thus, actuator 620 is centrally supported by anchor 660 such that at least a portion of the perimeter of actuator 620 is free to vibrate. Actuator 620 includes an anchored region 622, cantilevered arms 623, and tips 621 that are analogous to anchored region 122, cantilevered arms 123, and tips 121. Although not indicated in FIGS. 6A-6B, actuator 620 may be an engineered actuator analogous to actuator 120' and/or 220.

Cooling system 600 includes a vents 612-1 and 612-2 (collectively split vent 612) and feature 670. Thus, split vent 612 provides an inlet for fluid into top chamber 640. Feature 670 is a divider wall that protrudes from the surface of top plate 610 into top chamber 640. Feature 670 is analogous to features 170 of cooling system 100 in that feature 670 is configured to further restrict the path taken by fluid through cooling system 620. Although shown with sharp corners, feature 670 has rounded corners in some embodiments. The use of rounder corners may reduce or prevent the occurrence of vortices in the fluid flow. Feature (or wall) 670 separates opposite sides of chamber 640. Feature 670 is not shown as extending to the top of central portion 622 of actuator 620. However, in some embodiments, feature 670 extends to actuator 620. Feature 670 mostly or completely prevents fluid from vent 612-1 from reaching the opposing side of chamber 640. Feature 670 mostly or completely prevents fluid from vent 612-2 from reaching the opposing side of chamber 640. Thus, feature 670 obstructs the direct flow of the fluid within top chamber 640.

During operation, fluid enters top chamber 640 through each vent 612-1 and 612-2. Because of the presence of divider wall 670, the fluid moves generally toward the edge of top chamber 640 on the same side of feature 670 as the corresponding vent 612-1 and 612-2. As fluid is driven further from split vent 612 and past feature 670, the fluid spreads to occupy more of top chamber 640. Thus, the fluid may be viewed as transitioning from two-dimensional flow to three-dimensional flow. This change in fluid flow may be considered to increase the effective length of top chamber 640. Thus, the acoustic (i.e. fluidic) resonant frequency of cooling system 600 is reduced. Depending upon the size, location, and geometry of split vent 612 and feature 670, the acoustic resonant frequency of cooling system 600 may be tailored.

Cooling system 600 operates in an analogous manner to cooling system 100. Cooling system 600 thus shares the benefits of cooling system 100. Thus, performance of a device employing cooling system 600 may be improved. Further, the presence of feature 670 allows for tailoring of the acoustic resonant frequency. Thus, the performance may be improved.

Figure 7:
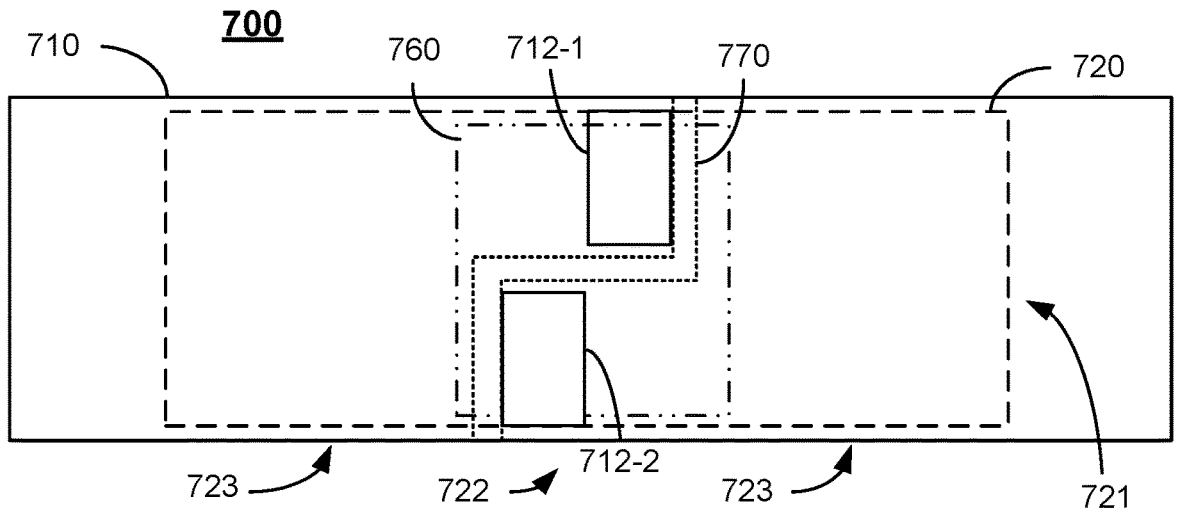
FIG. 7 depicts another embodiment of an active cooling system including an actuator and features in the upper chamber including a split vent.

FIG. 7 depicts an embodiment of active MEMS cooling system 700. For simplicity, only a top view of cooling system 700 is shown. FIG. 7 is not to scale. For simplicity, only portions of cooling system 700 are shown. Cooling system 700 is analogous to cooling system(s) 100, 200, 300, 400, 500 and/or 600. Consequently, analogous components have similar labels. For example, cooling system 700 is used in conjunction with a heat-generating structure (not shown), which is analogous to heat-generating structure 102. Cooling system 700 includes top plate 710 having vents 712-1 and 712-2 (collectively split vent 712), actuator 720, orifice plate (not shown) including orifices (not shown), top chamber (not shown) having a gap, bottom chamber (not shown) having a gap, flow chamber (not shown), anchor (i.e. support structure) 760, and feature 770 that are analogous to top plate 110 having vent 112, actuator 120, orifice plate 130 including orifices 132, top chamber 140 having gap 142, bottom chamber 150 having gap 152, flow chamber 140/150, anchor (i.e. support structure) 160, and features 170, respectively. Thus, actuator 720 is centrally supported by anchor 760 such that at least a portion of the perimeter of actuator 720 is free to vibrate. Actuator 720 includes an anchored region 722, cantilevered arms 723, and tips 721 that are analogous to anchored region 122, cantilevered arms 123, and tips 121. Although not indicated in FIG. 7, actuator 720 may be an engineered actuator analogous to actuator 120' and/or 220.

Cooling system 700 is most analogous to cooling system 600. Thus, split vent 712 and feature (divider wall) 770 are analogous to split vent 612 and feature 670. In addition, vents 712-1 and 712-2 are offset. Fluid is driven through cooling system 700 in an analogous manner to cooling system 600. Thus, fluid transitions from a one-dimensional flow to a two-dimensional flow. This may increase the effective length of the top chamber and reduce the acoustic resonant frequency of cooling system 700 to below a nominal acoustic resonant frequency that would be present in the absence of feature 770. Further, because vents 712-1 and 712-2 are offset, fluid traveling through cooling system 700 has an even longer path than if vents 712-1 and 712-2 were aligned. Thus, the acoustic resonant frequency may be further reduced.

Cooling system 700 operates in an analogous manner to cooling system 600. Cooling system 700 thus shares the benefits of cooling system 600. Thus, performance of a device employing cooling system 700 may be improved. Further, the presence of feature 770 allows for tailoring of the acoustic resonant frequency. Thus, the performance may be improved.

Figure 8:
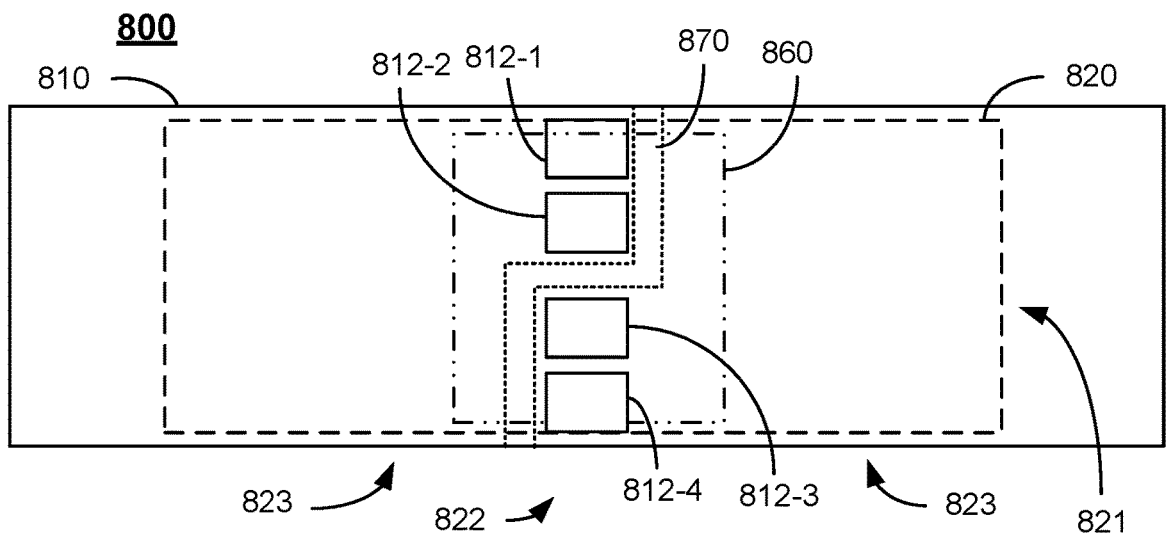
FIG. 8 depicts another embodiment of an active cooling system including an actuator and features in the upper chamber including a split vent.

FIG. 8 depicts an embodiment of active MEMS cooling system 800. For simplicity, only a top view of cooling system 800 is shown. FIG. 8 is not to scale. For simplicity, only portions of cooling system 800 are shown. Cooling system 800 is analogous to cooling system(s) 100, 200, 300, 400, 500, 600 and/or 700. Consequently, analogous components have similar labels. For example, cooling system 800 is used in conjunction with a heat-generating structure (not shown), which is analogous to heat-generating structure 102. Cooling system 800 includes top plate 810 having vents 812-1, 812-2, 812-3, and 812-4 (collectively split vent 812), actuator 820, orifice plate (not shown) including orifices (not shown), top chamber (not shown) having a gap, bottom chamber (not shown) having a gap, flow chamber (not shown), anchor (i.e. support structure) 860, and feature 870 that are analogous to top plate 110 having vent 112, actuator 120, orifice plate 130 including orifices 132, top chamber 140 having gap 142, bottom chamber 150 having gap 152, flow chamber 140/150, anchor (i.e. support structure) 160, and features 170, respectively. Thus, actuator 820 is centrally supported by anchor 860 such that at least a portion of the perimeter of actuator 820 is free to vibrate. Actuator 820 includes an anchored region 822, cantilevered arms 823, and tips 821 that are analogous to anchored region 122, cantilevered arms 123, and tips 121. Although not indicated in FIG. 8, actuator 820 may be an engineered actuator analogous to actuator 120' and/or 220.

Cooling system 800 is most analogous to cooling system(s) 600 and/or 700. Thus, split vent 812 and feature (divider wall) 870 are analogous to split vent 612 and feature 670. In addition, a larger number of vents 812-1, 812-2, 812-3, and 812-4 (i.e. four instead of two) are present. Fluid is driven through cooling system 800 in an analogous manner to cooling system 800. Thus, fluid transitions from a one-dimensional flow to a two-dimensional flow. This may increase the effective length of the top chamber and reduce the acoustic resonant frequency of cooling system 800 to below a nominal acoustic resonant frequency that would be present in the absence of feature 870. Thus, the acoustic resonant frequency may be reduced.

Cooling system 800 operates in an analogous manner to cooling systems 600 and 700. Cooling system 800 thus shares the benefits of cooling system(s) 600 and/or 700. Thus, performance of a device employing cooling system 800 may be improved. Further, the presence of feature 870 allows for tailoring of the acoustic resonant frequency. Thus, the performance may be improved.

Figure 9A:
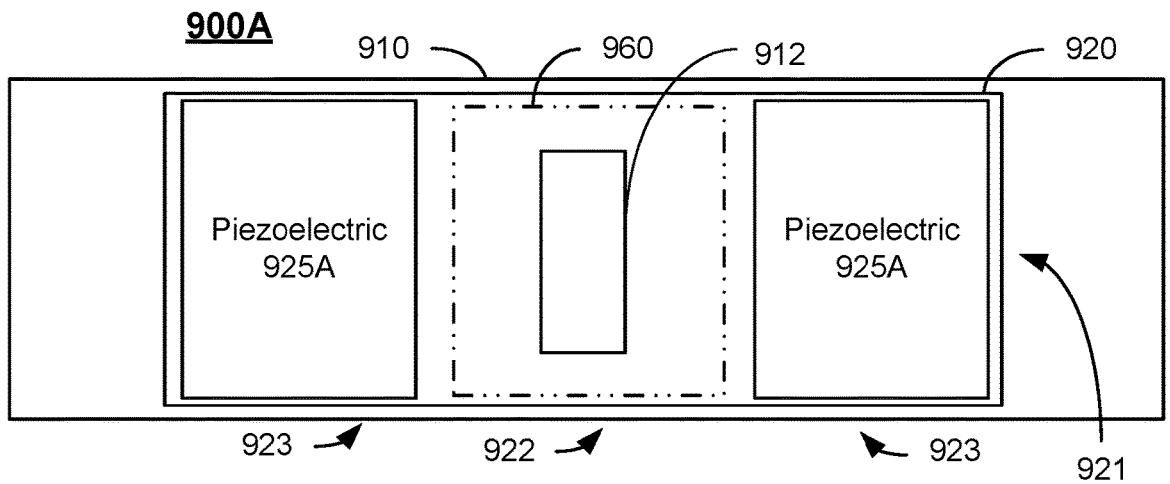
FIGS. 9A-9B depict top views of embodiments of active MEMS cooling systems.
Figure 9B:
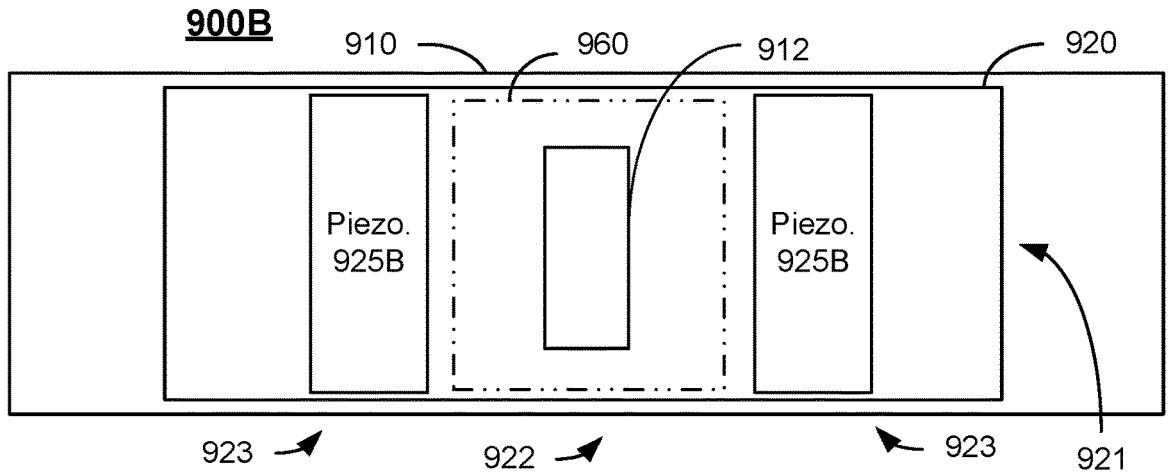

FIGS. 9A and 9B depict embodiments of active MEMS cooling systems 900A and 900B, respectively. For simplicity, only top views of cooling systems 900A and 900B are shown. FIGS. 9A and 9B are not to scale. For simplicity, only portions of cooling systems 900A and 900B are shown. Cooling systems 900A and 900B are analogous to cooling system(s) 100, 200, 300, 400, 500, 600, 700 and/or 800. Consequently, analogous components have similar labels. For example, cooling systems 900A and 900B are used in conjunction with a heat-generating structure (not shown), which is analogous to heat-generating structure 102. Cooling systems 900A and 900B each includes top plate 910 having vent 912, actuator 920, orifice plate (not shown) including orifices (not shown), top chamber (not shown) having a gap, bottom chamber (not shown) having a gap, flow chamber (not shown), and anchor (i.e. support structure) 960 that are analogous to top plate 110 having vent 112, actuator 120, orifice plate 130 including orifices 132, top chamber 140 having gap 142, bottom chamber 150 having gap 152, flow chamber 140/150, and anchor (i.e. support structure) 160, respectively. Thus, actuator 920 is centrally supported by anchor 960 such that at least a portion of the perimeter of actuator 920 is free to vibrate. Actuator 920 includes an anchored region 922, cantilevered arms 923, and tips 921 that are analogous to anchored region 122, cantilevered arms 123, and tips 121. Although not indicated in FIGS. 9A and 9B, actuator 920 may be an engineered actuator analogous to actuator 120' and/or 220. In some embodiments, cooling system(s) 900A and/or 900B may include features analogous to feature(s) 170, 270, 370, 470, 570, 670, 770, and/or 870. In some such embodiments, vent 912 may be a split vent.

In cooling systems 900A and 900B, cooling element 920 is driven by piezoelectrics 925A and 925B, respectively. As can be seen in FIGS. 9A and 9B, piezoelectrics 925A and 925B occupy a different fraction of cantilevered arms 923. For example, piezoelectric 925A occupies substantially all of cantilevered arm 923. Piezoelectric 925B occupies approximately half of cantilevered arm 923. For cooling systems 900A and 900B, the maximum flow rate for a given amplitude of deflection of tip 921 of actuator 920 occurs at a lower frequency for piezoelectric 925B that occupies less of cantilevered arm 923. Thus, in addition to tailoring the acoustic resonant frequency, cooling systems may also tailor the frequency at which the maximum flow rate occurs.

Figure 10A:
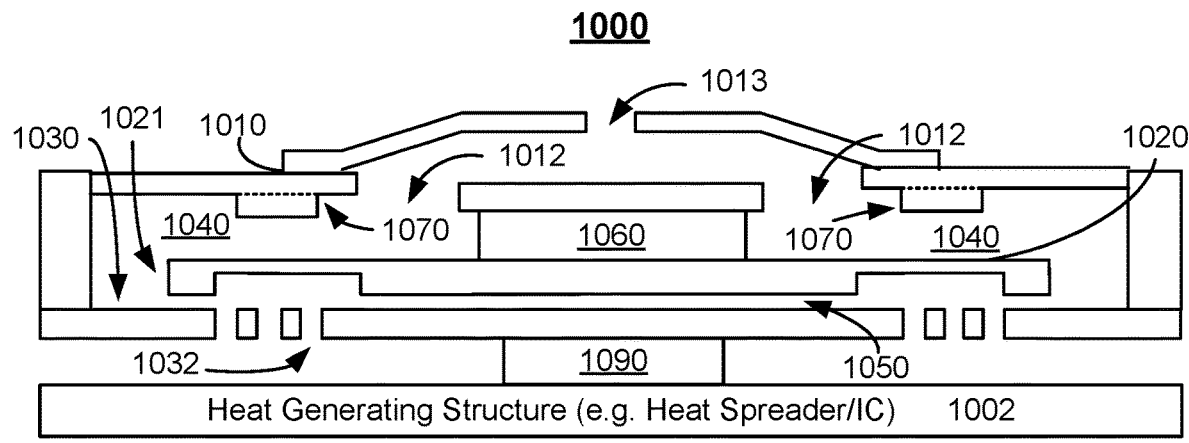
FIGS. 10A-10B depict embodiments of active cooling systems including an actuator and features in the upper chamber and different sized of piezoelectrics.
Figure 10B:
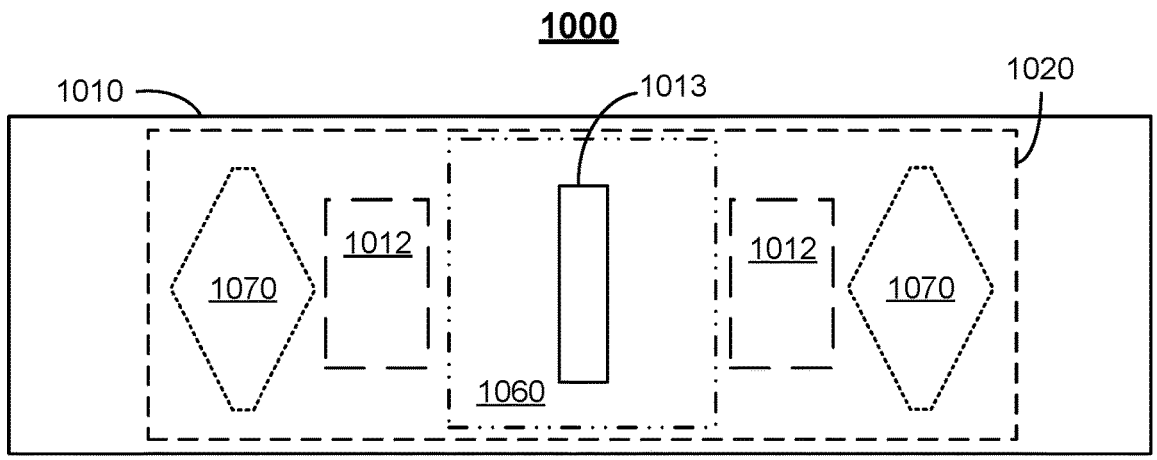

FIGS. 10A-10B depict an embodiment of active MEMS cooling system 1000 including a top centrally anchored cooling element. FIG. 10A depicts a side view of cooling system 1000 in a neutral position. FIG. 10B depicts a top view of cooling system 1000. FIGS. 10A-10B are not to scale. For simplicity, only portions of cooling system 1000 are shown. Referring to FIGS. 10A-10B, cooling system 1000 is analogous to cooling system 100. Consequently, analogous components have similar labels. For example, cooling system 1000 is used in conjunction with heat-generating structure 1002, which is analogous to heat-generating structure 102.

Cooling system 1000 includes top plate 1010 having vents 1012, cooling element 1020 having tip 1021, orifice plate 1030 including orifices 1032, top chamber 1040 having a gap, bottom chamber 1050 having a gap, flow chamber 1040/1050, anchor (i.e. support structure) 1060, pedestal 1090, and features 1070 that are analogous to top plate 110 having vent 112, cooling element 120 having tip 121, orifice plate 130 including orifices 132, top chamber 140 having gap 142, bottom chamber 150 having gap 152, flow chamber 140/150, anchor (i.e. support structure) 160, pedestal 190, and features 170, respectively. Thus, cooling element 1020 is centrally supported by anchor 1060 such that at least a portion of the perimeter of cooling element 1020 is free to vibrate. In some embodiments, anchor 1060 extends along the axis of cooling element 1020 (e.g. in a manner analogous to anchor 260A and/or 260B). In other embodiments, anchor 1060 is only near the center portion of cooling element 1020 (e.g. analogous to anchor 1060C and/or 1060D). Although not explicitly labeled in FIGS. 10A and 10B, cooling element 1020 includes an anchored region and cantilevered arms including step region, extension region and outer regions analogous to anchored region 122, cantilevered arms 123, step region 124, extension region 126 and outer region 128 of cooling element 120'. In some embodiments, cantilevered arms of cooling element 1020 are driven in-phase. In some embodiments, cantilevered arms of cooling element 1020 are driven out-of-phase. In some embodiments, a simple cooling element, such as cooling element 120, may be used.

Anchor 1060 supports cooling element 1020 from above. Thus, cooling element 1020 is suspended from anchor 1060. Anchor 1060 is suspended from top plate 1010. Top plate 1010 includes vent 1013. Vents 1012 on the sides of anchor 1060 provide a path for fluid to flow into sides of chamber 1040.

As discussed above with respect to cooling system 100, cooling element 1020 may be driven to vibrate at or near the structural resonant frequency of cooling element 1020. Further, the structural resonant frequency of cooling element 1020 may be configured to align with the acoustic resonance of the chamber 1040/1050. Moreover, features 1070 may be used to tailor the acoustic resonant frequency of chamber 1040/1050. The structural and acoustic resonant frequencies are generally chosen to be in the ultrasonic range. For example, the vibrational motion of cooling element 1020 may be at the frequencies described with respect to cooling system 100. Consequently, efficiency and flow rate may be enhanced. However, other frequencies may be used.

Cooling system 1000 operates in an analogous manner to cooling system 100. Cooling system 1000 thus shares the benefits of cooling system 100. Thus, performance of a device employing cooling system 1000 may be improved. In addition, suspending cooling element 1020 from anchor 1060 may further enhance performance. In particular, vibrations in cooling system 1000 that may affect other cooling cells (not shown), may be reduced. For example, less vibration may be induced in top plate 1010 due to the motion of cooling element 1020. Consequently, cross talk between cooling system 1000 and other cooling systems (e.g. other cells) or other portions of the device incorporating cooling system 1000 may be reduced. Thus, performance may be further enhanced.

Figure 11A:
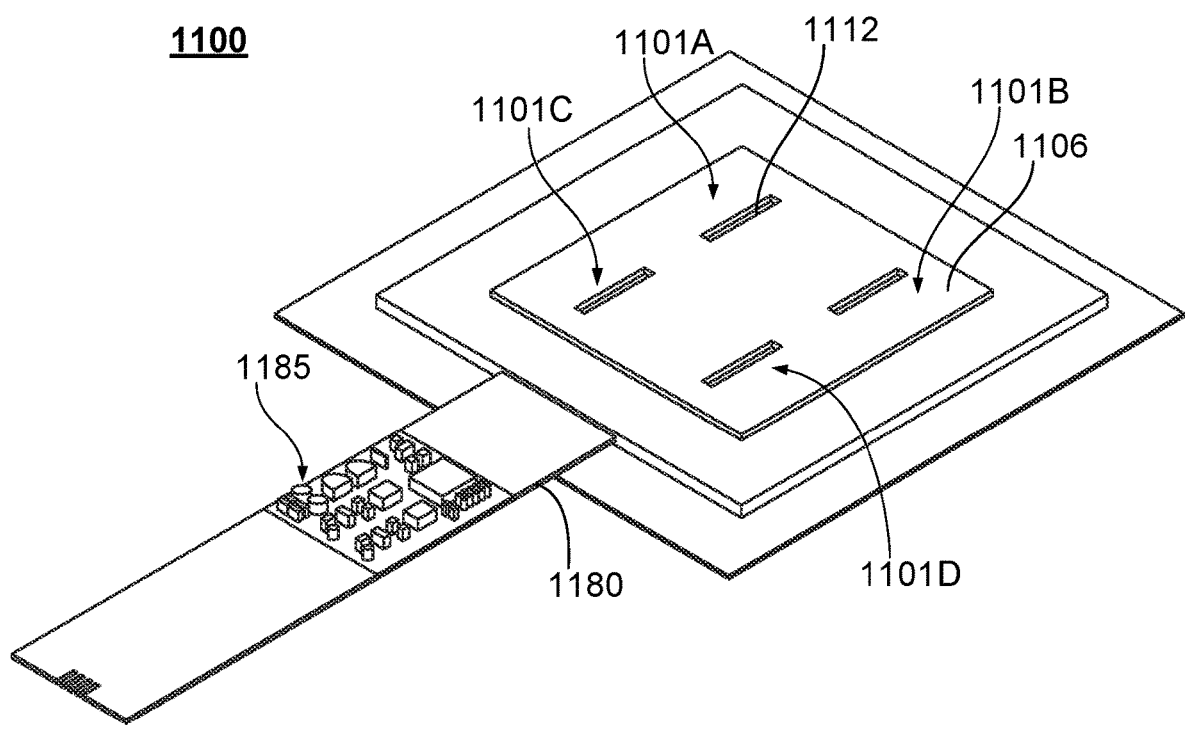

FIGS. 11A-11C depict an embodiment of active MEMS cooling system 1100 including multiple cooling cells configured as a module termed a tile, or array. FIG. 11A depicts a perspective view, while FIGS. 11B-11C depict side views. FIGS. 11A-11C are not to scale. Cooling system 1100 includes four cooling cells 1101A, 1101B, 1101C and 1101D (collectively or generically 1101), which are analogous to one or more of cooling systems described herein. More specifically, cooling cells 1101 are analogous to cooling system 100 and/or 400. Tile 1100 thus includes four cooling cells 1101 (i.e. four MEMS jets). Although four cooling cells 1101 in a 2×2 configuration are shown, in some embodiments another number and/or another configuration of cooling cells 1101 might be employed. In the embodiment shown, cooling cells 1101 include shared top plate 1110 having apertures 1112, cooling elements 1120, shared orifice plate 1130 including orifices 1132, top chambers 1140, bottom chambers 1150, anchors (support structures) 1160, and features 1170 that are analogous to top plate 110 having apertures 112, cooling element 120, orifice plate 130 having orifices 132, top chamber 140, bottom chamber 150, anchor 160, and features 170, respectively. In some embodiments, cooling cells 1101 may be fabricated together and separated, for example by cutting through top plate 1110, side walls between cooling cells 1101, and orifice plate 1130. Thus, although described in the context of a shared top plate 1110 and shared orifice plate 1130, after fabrication cooling cells 1101 may be separated. In some embodiments, tabs (not shown) and/or other structures such as anchors 1160, may connect cooling cells 1101. Further, tile 1100 includes heat-generating structure (termed a heat spreader hereinafter) 1102 (e.g. a heat sink, a heat spreader, integrated circuit, or other structure) that also has sidewalls, or fencing, in the embodiment shown. Cover plate 1106 is also shown. Heat spreader 1102 and cover plate 1106 may be part of an integrated tile 1100 as shown or may be separate from tile 1100 in other embodiments. Heat spreader 1102 and cover plate 1106 may direct fluid flow outside of cooling cells 1101, provide mechanical stability, and/or provide protection. Electrical connection to cooling cells 1101 is provided via flex connector 1180 (not shown in FIGS. 11B-11C) which may house drive electronics 1185. Cooling elements 1120 are driven out-of-phase (i.e. in a manner analogous to a seesaw). Further, as can be seen in FIGS. 11B-11C cooling element 1120 in one cell is driven out-of-phase with cooling element(s) 1120 in adjacent cell(s). By driving cooling elements 1120 out-of-phase, vibrations in cooling system 1100 may be reduced.

Cooling cells 1101 of cooling system 1100 functions in an analogous manner to cooling system(s) 100, 400, and/or an analogous cooling system. Consequently, the benefits described herein may be shared by cooling system 1100. Because cooling elements in nearby cells are driven out-of-phase, vibrations in cooling system 1100 may be reduced. Because multiple cooling cells 1101 are used, cooling system 1100 may enjoy enhanced cooling capabilities. Further, multiples of individual cooling cells 1101 and/or cooling system 1100 may be combined in various fashions to obtain the desired footprint of cooling cells.

FIG. 12 is a flow chart depicting an exemplary embodiment of method 1200 for operating a cooling system. Method 1200 may include steps that are not depicted for simplicity. Method 1200 is described in the context of piezoelectric cooling system 100. However, method 1200 may be used with other cooling systems including but not limited to systems and cells described herein.

One or more of the actuator(s) in a cooling system is actuated to vibrate, at 1202. At 1202, an electrical signal having the desired frequency is used to drive the actuator(s). In some embodiments, the actuators are driven at or near structural and/or acoustic resonant frequencies at 1202. The driving frequency may be 15 kHz or higher. If multiple actuators are driven at 1202, the cooling actuators may be driven out-of-phase. In some embodiments, the actuators are driven substantially at one hundred and eighty degrees out of phase. Further, in some embodiments, individual actuators are driven out-of-phase. For example, different portions of an actuator may be driven to vibrate in opposite directions (i.e. analogous to a seesaw). In some embodiments, individual actuators may be driven in-phase (i.e. analogous to a butterfly). In addition, the drive signal may be provided to the anchor(s), the actuator(s), or both the anchor(s) and the actuator(s). Further, the anchor may be driven to bend and/or translate.

Feedback from the piezoelectric actuator(s) is used to adjust the driving current, at 1204. In some embodiments, the adjustment is used to maintain the frequency at or near the acoustic and/or structural resonant frequency/frequencies of the actuator(s) and/or cooling system. Resonant frequency of a particular actuator may drift, for example due to changes in temperature. Adjustments made at 1204 allow the drift in resonant frequency to be accounted for.

For example, piezoelectric actuator 120 may be driven at its structural resonant frequency/frequencies, at 1202. This resonant frequency may also be at or near the acoustic resonant frequency for top chamber 140. This may be achieved by driving piezoelectric layer(s) in anchor 160 (not shown in FIGS. 1A-1F) and/or piezoelectric layer(s) in actuator 120. At 1204, feedback is used to maintain actuator 120 at resonance and, in some embodiments in which multiple actuators are driven, one hundred and eighty degrees out of phase. Thus, the efficiency of actuator 120 in driving fluid flow through cooling system 100 and onto heat-generating structure 102 may be maintained. In some embodiments, 1204 includes sampling the current through cooling element 120 and/or the current through anchor 160 and adjusting the current to maintain resonance and low input power.

Consequently, actuators, such as actuator(s) 120, 220, 320, 420, 520, 620, 720, 820, 920, 1020 and/or 1120 may operate as described herein. Method 1200 thus provides for use of piezoelectric cooling systems described herein. Further, because of the presence of features 170, 270, 370, 470, 570, 670, 770, 870, 1070, and/or 1170, the acoustic resonant frequency corresponding to the frequency at which the actuator is driven may be tailored. Thus, piezoelectric cooling systems may more efficiently and quietly cool semiconductor devices at lower power.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A fluid flow system, comprising:
an actuator configured to vibrate in response to a driving signal;
a chamber in communication with the actuator, the chamber being characterized by a fluidic resonant frequency, a vibration of the actuator tending to drive a fluid through the chamber; and
a feature within the chamber that obstructs direct flow of the fluid within the chamber such that the fluidic resonant frequency is less than a nominal fluidic resonant frequency that would exist without the feature;
wherein the chamber includes an upper chamber and a lower chamber, the actuator residing between the upper chamber and the lower chamber, the feature residing in the upper chamber, the actuator being configured to direct the fluid from the upper chamber to the lower chamber in response to the driving signal.

2. The fluid flow system of claim 1, wherein the feature is configured to increase an effective length for the chamber.

3. The fluid flow system of claim 1, wherein the chamber includes an upper chamber having a top wall and wherein the feature includes at least one mesa extending from the top wall.

4. A fluid flow system, comprising:
an actuator configured to vibrate in response to a driving signal;
a chamber in communication with the actuator, the chamber being characterized by a fluidic resonant frequency, a vibration of the actuator tending to drive a fluid through the chamber; and
a feature within the chamber that obstructs direct flow of the fluid within the chamber such that the fluidic resonant frequency is less than a nominal fluidic resonant frequency that would exist without the feature;
wherein the chamber includes an upper chamber having a top wall and wherein the feature includes at least one mesa extending from the top wall; and
wherein the at least one mesa is configured such that at least seventy-five percent of the fluid is directed around the at least one mesa and not more than twenty-five percent of the fluid travels between the at least one mesa and the actuator.

5. The fluid flow system of claim 3, wherein the at least one mesa has a footprint configured to reduce fluidic vortices.

6. A fluid flow system, comprising:
an actuator configured to vibrate in response to a driving signal;
a chamber in communication with the actuator, the chamber being characterized by a fluidic resonant frequency, a vibration of the actuator tending to drive a fluid through the chamber; and a feature within the chamber that obstructs direct flow of the fluid within the chamber such that the fluidic resonant frequency is less than a nominal fluidic resonant frequency that would exist without the feature; wherein the chamber includes an upper chamber having a top wall and wherein the feature includes at least one mesa extending from the top wall, the at least one mesa having a footprint configured to reduce fluidic vortices, the footprint being selected from a triangle, a diamond, and a flattened diamond.

7. A fluid flow system, comprising:
an actuator configured to vibrate in response to a driving signal;
a chamber in communication with the actuator, the chamber being characterized by a fluidic resonant frequency, a vibration of the actuator tending to drive a fluid through the chamber; and
a feature within the chamber that obstructs direct flow of the fluid within the chamber such that the fluidic resonant frequency is less than a nominal fluidic resonant frequency that would exist without the feature;
wherein the chamber includes an upper chamber having a top wall, the top wall having a split vent therein, the split vent including a first aperture and a second aperture; and
wherein the feature includes a divider wall separating the first aperture from the second aperture such that the first aperture is in fluid communication with a first portion of the chamber and the second aperture is in fluid communication with a second portion of the chamber.

8. The fluid flow system of claim 7, wherein the chamber is characterized by a center line, the first aperture is offset from the center line in a first direction, and the second aperture is offset from the center line in a second direction opposite to the first direction.

9. The fluid flow system of claim 7, wherein the split vent includes a third aperture and a fourth aperture.

10. A fluid flow system, comprising:
an actuator configured to vibrate in response to a driving signal;
a chamber in communication with the actuator, the chamber being characterized by a fluidic resonant frequency, a vibration of the actuator tending to drive a fluid through the chamber;
a feature within the chamber that obstructs direct flow of the fluid within the chamber such that the fluidic resonant frequency is less than a nominal fluidic resonant frequency that would exist without the feature; and
a support structure;
wherein the actuator includes a central region and a perimeter, the actuator being supported by the support structure at the central region, at least a portion of the perimeter being unpinned, the at least the portion of the perimeter configured to vibrate in response to the driving signal.

11. A cooling system, comprising:
a cooling element configured to vibrate in response to a driving signal;
a chamber in communication with the cooling element, the chamber being characterized by a fluidic resonant frequency, the chamber including an orifice plate having at least one orifice therein, a vibration of the cooling element tending to drive a fluid through the chamber and out the at least one orifice; and
a feature within the chamber that obstructs direct flow of the fluid within the chamber such that the fluidic resonant frequency is less than a nominal fluidic resonant frequency that would exist without the feature;
wherein the chamber includes an upper chamber and a lower chamber, the cooling element residing between the upper chamber and the lower chamber, the feature residing in the upper chamber, the cooling element being configured to direct the fluid from the upper chamber to the lower chamber in response to the driving signal.

12. The cooling system of claim 11, wherein the feature is configured to increase an effective length for the chamber.

13. The cooling system of claim 11, wherein the chamber includes an upper chamber having a top wall and wherein the feature includes at least one mesa extending from the top wall.

14. A cooling system, comprising:
a cooling element configured to vibrate in response to a driving signal;
a chamber in communication with the cooling element, the chamber being characterized by a fluidic resonant frequency, the chamber including an orifice plate having at least one orifice therein, a vibration of the cooling element tending to drive a fluid through the chamber and out the at least one orifice; and
a feature within the chamber that obstructs direct flow of the fluid within the chamber such that the fluidic resonant frequency is less than a nominal fluidic resonant frequency that would exist without the feature;
wherein the chamber includes an upper chamber having a top wall and wherein the feature includes at least one mesa extending from the top wall, the at least one mesa being configured such that at least seventy-five percent of the fluid is directed around the at least one mesa and not more than twenty-five percent of the fluid travels between the at least one mesa and the cooling element.

15. A cooling system, comprising:
a cooling element configured to vibrate in response to a driving signal;
a chamber in communication with the cooling element, the chamber being characterized by a fluidic resonant frequency, the chamber including an orifice plate having at least one orifice therein, a vibration of the cooling element tending to drive a fluid through the chamber and out the at least one orifice; and
a feature within the chamber that obstructs direct flow of the fluid within the chamber such that the fluidic resonant frequency is less than a nominal fluidic resonant frequency that would exist without the feature;
wherein the chamber includes an upper chamber having a top wall, the top wall having a split vent therein, the split vent including a first aperture and a second aperture; and
wherein the feature includes a divider wall separating the first aperture from the second aperture such that the first aperture is in fluid communication with a first portion of the chamber and the second aperture is in fluid communication with a second portion of the chamber.

16. The cooling system of claim 15, wherein the chamber is characterized by a center line, the first aperture is offset from the center line in a first direction, and the second aperture is offset from the center line in a second direction opposite to the first direction.

17. A cooling system, comprising:
a cooling element configured to vibrate in response to a driving signal;
a chamber in communication with the cooling element, the chamber being characterized by a fluidic resonant frequency, the chamber including an orifice plate having at least one orifice therein, a vibration of the cooling element tending to drive a fluid through the chamber and out the at least one orifice;

a feature within the chamber that obstructs direct flow of the fluid within the chamber such that the fluidic resonant frequency is less than a nominal fluidic resonant frequency that would exist without the feature; and a support structure;

wherein the cooling element includes a central region and a perimeter, the cooling element being supported by the support structure at the central region, at least a portion of the perimeter being unpinned, the at least the portion of the perimeter configured to vibrate in response to the driving signal.

18. A method, comprising:

driving an actuator configured to induce a vibrational motion at a frequency, the actuator being in communication with a chamber, the chamber being characterized by a fluidic resonant frequency, a vibration of the actuator tending to drive a fluid through the chamber;

wherein a feature resides within the chamber and obstructs direct flow of the fluid within the chamber such that the fluidic resonant frequency is less than a nominal fluidic resonant frequency that would exist without the feature, and wherein the chamber includes an upper chamber and a lower chamber, the actuator residing between the upper chamber and the lower chamber, the feature residing in the upper chamber, the actuator being configured to direct the fluid from the upper chamber to the lower chamber in response to the driving of the actuator.

19. The method of claim 18, wherein the feature is configured to increase an effective length for the chamber.

* * * * *